US012794985B2

(12) United States Patent
Seed et al.

(10) Patent No.: US 12,794,985 B2
(45) **Date of Patent: *Nov. 10, 2026**

(54) AUTOMATED RELATIONSHIP MANAGEMENT OF SERVICE LAYER ENTITIES IN A COMMUNICATIONS NETWORK

(71) Applicant: IPLA Holdings Inc., New York, NY (US)

(72) Inventors: Dale N. Seed, Allentown, PA (US); Catalina Mihaela Mladin, Hatboro, PA (US); Quang Ly, North Wales, PA (US); Zhuo Chen, Claymont, DE (US); William Robert Flynn, IV, Schwenksville, PA (US); Lu Liu, Conshohocken, PA (US); Jiwan Ninglekhu, Royersford, PA (US); Michael F. Starsinic, Newtown, PA (US); Chonggang Wang, Princeton, NJ (US)

(73) Assignee: IPLA HOLDINGS INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/065,791

(22) Filed: Feb. 27, 2025

(65) Prior Publication Data

US 2025/0267195 A1 Aug. 21, 2025

Related U.S. Application Data

(63) Continuation of application No. 17/265,232, filed as application No. PCT/US2019/044856 on Aug. 2, 2019, now Pat. No. 12,267,757.

(Continued)

(51) Int. Cl.
*H04L 67/125* (2022.01)
*H04L 41/0894* (2022.01)
(Continued)

(52) U.S. Cl.
CPC ........ *H04L 67/125* (2013.01); *H04L 41/0894* (2022.05); *H04W 4/38* (2018.02);
(Continued)

(58) Field of Classification Search
CPC ........... H04W 4/50; H04W 4/38; H04W 4/70; H04W 28/0268; H04W 72/04;
(Continued)

(56) References Cited

U.S. PATENT DOCUMENTS

2018/0103337 A1 4/2018 Di Girolamo et al.
2018/0109929 A1 4/2018 Ly et al.
(Continued)

FOREIGN PATENT DOCUMENTS

WO 2015/116681 A1 8/2015

OTHER PUBLICATIONS

ISO/IEC JTC 1 WG 10 et al., "[JTC 1/WG 10] Request for comments on the CD Text of ISO/IEC 30141, IoT Reference Architecture," TP-2016-0333-REQUEST_COMMENTS_ON_ISO_IEC30141_IOT_REFERENCE_ARCHITECTURE.ZIP, ONEM2M, (2016), p. 1-73.

*Primary Examiner* — Brian T Le
(74) *Attorney, Agent, or Firm* — XSENSUS LLP

(57) ABSTRACT

Systems and methods are described to automate managing of relationships between IoT entities (e.g., devices, apps, users) and offloading the burden of managing these relationships from users. A Relationship Management Service (RM
(Continued)

Service) is described herein for the autonomous establishment, modification, and tear-down of relationships between IoT entities.

20 Claims, 20 Drawing Sheets

Related U.S. Application Data

(60) Provisional application No. 62/713,779, filed on Aug. 2, 2018.

(51) Int. Cl.

| | |
|---|---|
| ***H04L 41/0895*** | (2022.01) |
| ***H04L 67/12*** | (2022.01) |
| ***H04W 4/38*** | (2018.01) |
| ***H04W 4/50*** | (2018.01) |
| ***H04W 4/70*** | (2018.01) |
| ***H04W 28/02*** | (2009.01) |
| ***H04W 72/04*** | (2023.01) |
| ***H04W 84/18*** | (2009.01) |

(52) U.S. Cl.
CPC ............... *H04W 4/50* (2018.02); *H04W 4/70* (2018.02); *H04W 28/0268* (2013.01); *H04W 72/04* (2013.01); *H04W 84/18* (2013.01); *H04L 41/0895* (2022.05); *H04L 67/12* (2013.01)

(58) Field of Classification Search
CPC ... H04W 72/12; H04W 72/11; H04W 72/115; H04W 72/40; H04W 84/18; H04W 16/00; H04W 36/06; H04B 7/024; H04L 1/0001; H04L 5/00; H04L 29/08306; H04L 29/08567; H04L 41/0893; H04L 41/0894; H04L 41/0895; H04L 41/5041; H04L 41/00; H04L 41/08; H04L 12/2823; H04L 12/2814; H04L 67/125; H04L 67/12; H04L 67/025; H04L 67/104; H04L 67/01
See application file for complete search history.

(56) References Cited

U.S. PATENT DOCUMENTS

2018/0167761 A1* 6/2018 Dong ...................... H04W 4/70
2018/0183897 A1* 6/2018 Singhal ................. G06F 21/305

* cited by examiner

AUTOMATED RELATIONSHIP MANAGEMENT OF SERVICE LAYER ENTITIES IN A COMMUNICATIONS NETWORK

CROSS REFERENCE TO RELATED APPLICATIONS

This application is a continuation of U.S. patent application Ser. No. 17/265,232, filed Feb. 2, 2021, which is the National Stage Application of International Patent Application No. PCT/US2019/044856, filed Aug. 2, 2019, which claims the benefit of the filing date of U.S. provisional patent application No. 62/713,779, filed Aug. 2, 2018, titled "Methods to Automate Relationship Management of M2M/IoT Service Layer Entities," the entirety of which is incorporated herein for any and all purposes.

BACKGROUND

An M2M/IoT Service Layer ("Service Layer" or "SL") is a technology specifically targeted towards providing value-added services for M2M/IoT devices, applications, and data. Recently, several industry standard bodies (e.g., oneM2M, ETSI, OCF and LWM2M) have been developing M2M/IoT SLs to address challenges associated with the integration of M2M/IoT devices, applications, and data into deployments with the Internet/Web, cellular, enterprise, and home network.

An M2M/IoT SL may provide applications and devices access to a collection of M2M/IoT oriented capabilities. Example capabilities may include security, charging, data management, device management, discovery, provisioning, and connectivity management. Such capabilities may be made available to applications via APIs that make use of message formats, resource structures and resource representations supported by the M2M/IoT SL.

From a protocol stack perspective, SLs may typically be situated above the Application Protocol Layer and provide value added services to applications they support. Hence, SLs are often categorized as 'middleware' services. FIG. 1 illustrates an exemplary service layer between Application Protocols and Applications.

From a deployment perspective, an M2M/IoT SL may be deployed on various types of network nodes including, for example, servers, gateways and devices, as shown in FIG. 2.

The oneM2M standard defines an M2M/IoT SL. The purpose of the SL is to provide "horizontal" services that may be utilized by different "vertical" IoT systems and applications, such as e-Health, fleet management, and smart homes. The architecture of the oneM2M SL, as shown in FIG. 3, defines a Common Service Entity (CSE) that may support four reference points. The Mca reference point may interface with an Application Entity (AE). The Mcc reference point may interface with another CSE within the same service provider domain, and the Mcc' reference point may interface with another CSE in a different service provider domain. The Men reference point may interface with the underlying network service entity (NSE). An NSE may provide underlying network services to the CSEs, such as device management, location services, and device triggering. A CSE may contain multiple logical functions called "Common Service Functions (CSFs)", such as "Discovery", "Data Management & Repository". FIG. 4 illustrates CSFs supported by oneM2M.

The following definitions are useful when describing SLs. While the following definitions are described with respect to an M2M/IoT system, they may be applicable to any such similar systems.

An M2M/IoT Service Layer (SL) may be a software middleware layer that supports value-added services for M2M/IoT applications and devices through a set of Application Programming Interfaces (APIs) and underlying networking interfaces. An SL may comprise a collection of M2M/IoT services that may be used by devices, applications, and users. An SL may also host resources.

An M2M/IoT Application may be a software entity that registers to an M2M/IoT Service Layer and performs application specific functionality pertaining to a particular M2M/IoT use case, such as eHealth, smart energy, or home automation, for example.

An M2M/IoT Entity may be an M2M/IoT application or M2M/IoT device or a user of an M2M/IoT application or M2M/IoT device.

An M2M/IoT Service may be a software entity that provides capabilities to M2M/IoT entities (e.g., data management, security, device management).

A Service Layer Entity may be an M2M/IoT entity that enrolls and/or registers to an M2M/IoT Service Layer. Examples may include an M2M/IoT Application or an instance of an M2M/IoT Service Layer.

A resource, or Service Layer Resource, may be a uniquely addressable object (i.e., data structure) that contains information (e.g., data) and may be hosted by an M2M/IoT Service Layer.

A Service Layer Device may be an entity that registers to an M2M/IoT service layer and may host one or more applications.

A Service Layer Primitive may be a message using a Service Layer API to access data or services offered by the Service Layer. A Service Layer Request and a Service Layer Response are examples of Service Layer Primitives.

A Service Layer Request may be an operation issued by a Service Layer Entity that targets a Service Layer Resource.

An M2M/IoT Service Layer Registration may be an act of an M2M/IoT service layer entity registering to an M2M/IoT service layer.

An M2M/IoT Registrant may be an M2M/IoT Entity registered to or using an M2M/IoT Service Layer, such as applications, sensors, devices, and/or other M2M/IoT Service Layers, for example.

An M2M/IoT Service Platform may be a platform deployed by an M2M/IoT service provider that may optionally host an M2M/IoT service layer.

An M2M/IoT Service Provider may be a stakeholder (e.g., a company) responsible for the deployment and management of an M2M/IoT service platform.

An M2M/IoT Service Subscriber may be a stakeholder (e.g., a human being) that establishes a subscription (i.e., enrolls) with an M2M/IoT service provider to access and use its M2M/IoT services.

An M2M/IoT Service Enrollment may be an act of an M2M/IoT service subscriber establishing a service subscription with an M2M/IoT service provider and enrolling its devices, applications, data, and authorized users with the service provider's platform.

An M2M/IoT User may be an authorized entity associated with an M2M/IoT service subscriber. An M2M/IoT service subscriber may grant specified privileges to specified M2M/IoT users to access specified devices, applications, data, and services via the M2M/IoT service provider's platform.

Persistence, as described herein, may refer to the storage of data in a computer system that extends beyond the operation of creating the data. Such data may remain in the computer system until it is deleted or gets corrupted. Pre-persistence may refer to procedures performed before storing the data. Post-persistence may refer to procedures performed after storing the data.

Metadata may be data that provides information about other data.

The oneM2M architecture is a distributed architecture and supports deploying M2M/IoT services in a distributed manner across the following types of Nodes: Application Service Nodes (ASNs); Application Dedicated Nodes (ADNs); Middle Nodes (MNs); Infrastructure Nodes (INs); and Non-oneM2M Nodes (NoDNs).

An ASN is a Node that comprises one CSE and comprises at least one Application Entity (AE). In an example embodiment, an ASN may reside in an IoT Device.

An ADN is a Node that comprises at least one AE and may not include a CSE. In an example embodiment, an Application Dedicated Node may reside in a constrained IoT Device.

An MN is a Node that comprises a CSE and comprises zero or more AEs. In an example embodiment, an MN may reside in an IoT Gateway.

An IN is a Node that comprises a CSE and comprises zero or more AEs. A CSE in an IN may comprise CSE functions not applicable to other node types. In an example embodiment, an IN may reside in an IoT Service Infrastructure.

A non-oneM2M Node is a Node that may not include oneM2M Entities (neither AEs nor CSEs). Such Nodes may represent devices attached to the oneM2M system for interworking purposes, including management.

Configurations of inter-connecting the various entities supported within a oneM2M system are illustrated in FIG. 5.

SUMMARY

Managing relationships between M2M/IoT entities in M2M/IoT deployments is traditionally performed by one or more users. However, in large scale M2M/IoT deployments, relying on users to manage relationships may become untenable as the relationships become more complex. Relying on users to manually configure relationships between devices using applications built to only configure types of devices from specific manufacturers is not an effective and scalable approach. In addition, user management of short-lived and dynamic relationships between M2M/IoT devices is not only burdensome for the user, but also may not be optimal from a system scalability perspective.

Systems and methods are described herein to automate managing of relationships between IoT entities (e.g., devices, apps, users) and offloading the burden of managing these relationships from users. A Relationship Management Service (RM Service) is described herein for the autonomous establishment, modification, and tear-down of relationships between IoT entities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
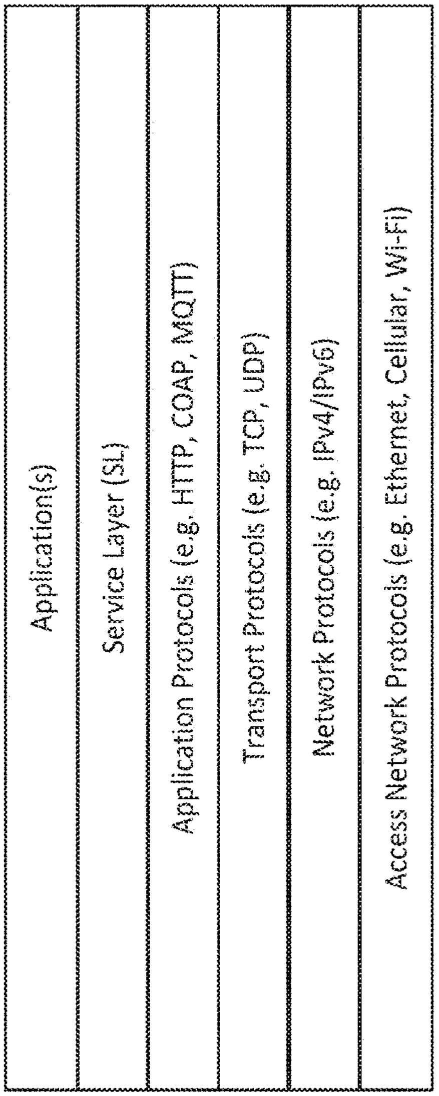
FIG. 1 illustrates an example protocol stack with a service layer between application protocols and applications.
Figure 2:
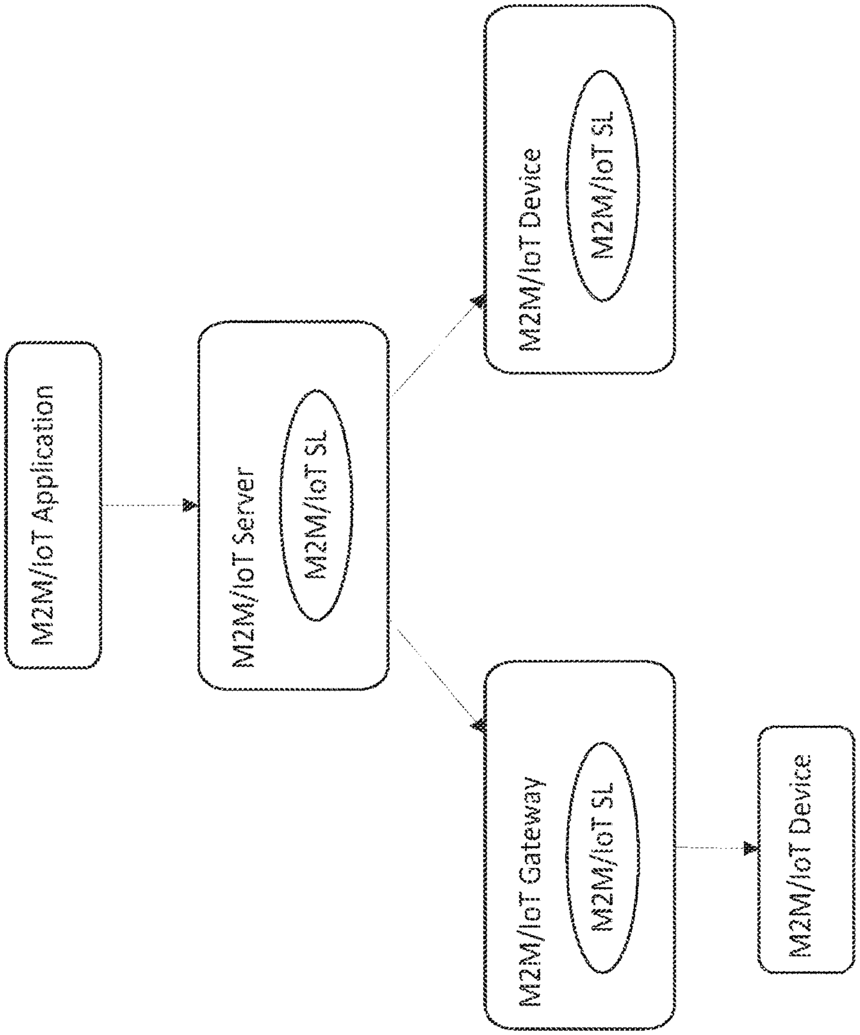
FIG. 2 illustrates an example M2M/IoT deployment.
Figure 3:
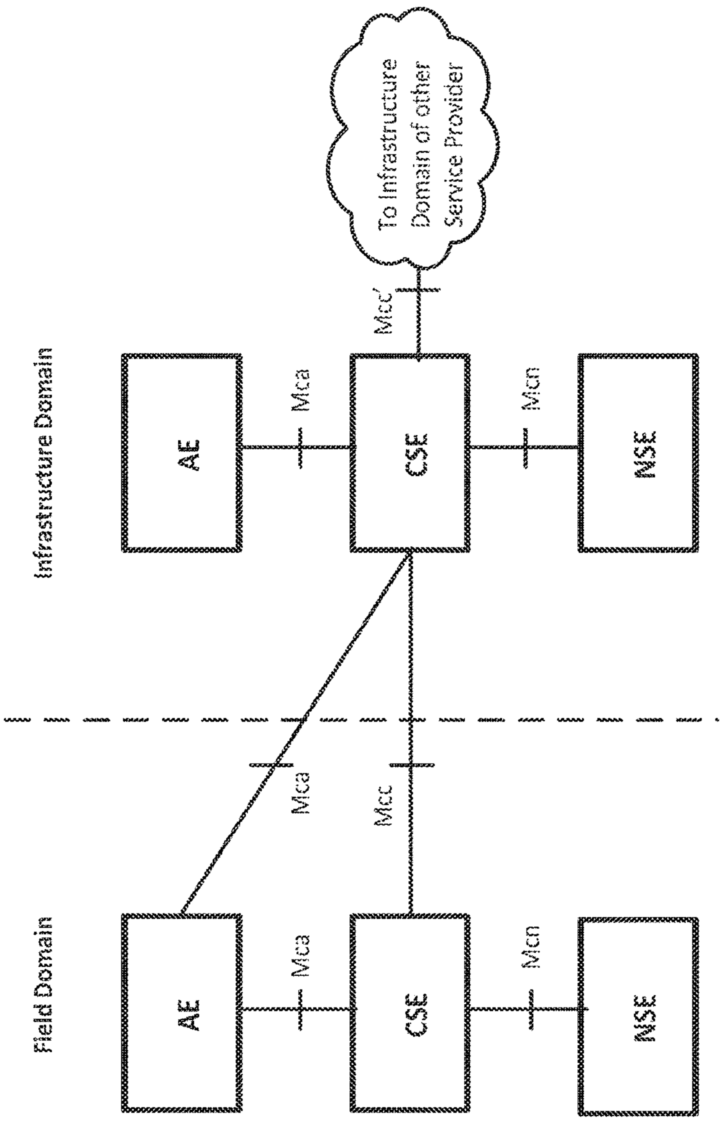
FIG. 3 illustrates an example oneM2M service layer architecture.
Figure 4:
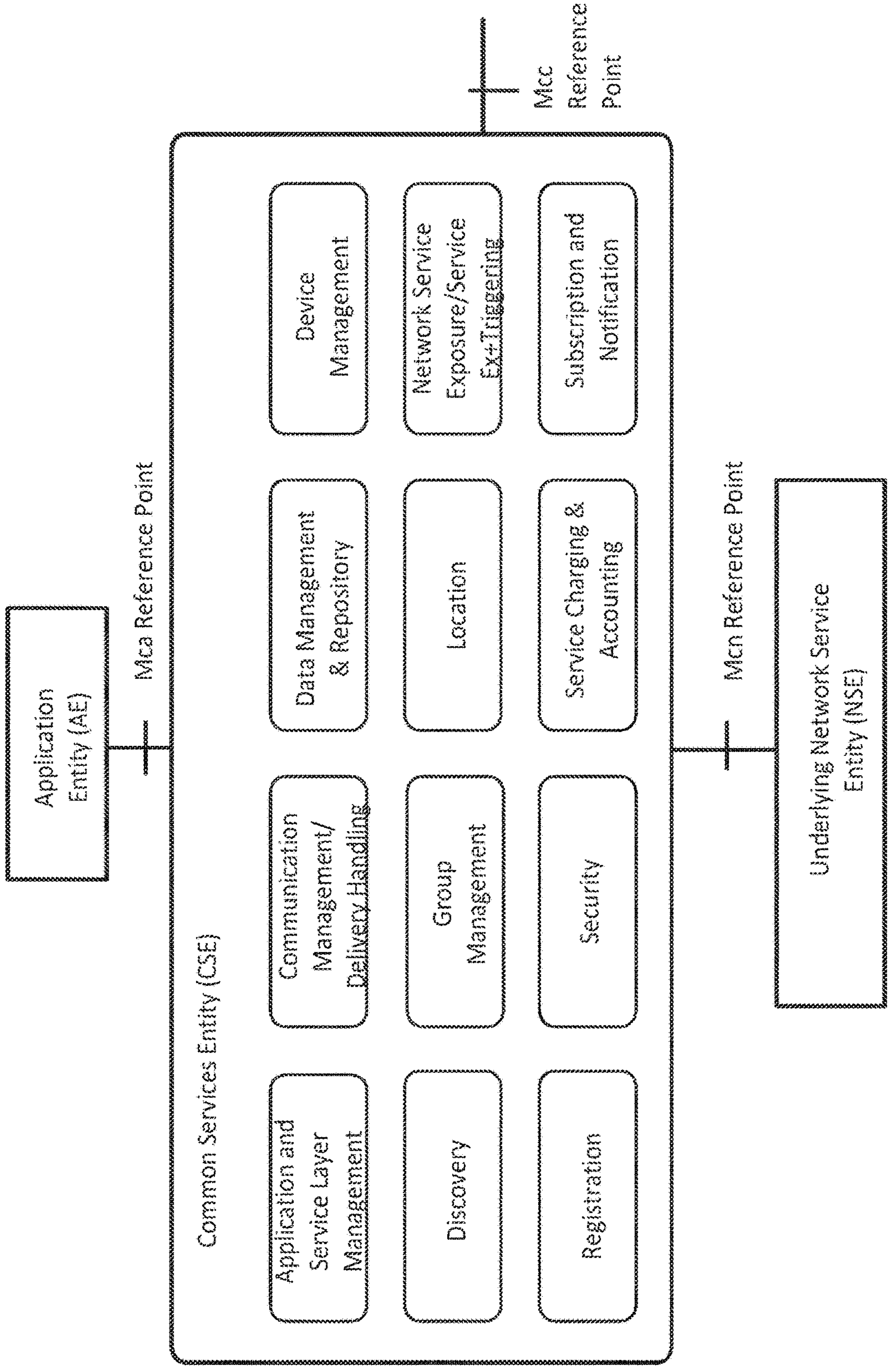
FIG. 4 illustrates example CSFs currently defined by oneM2M.
Figure 5:
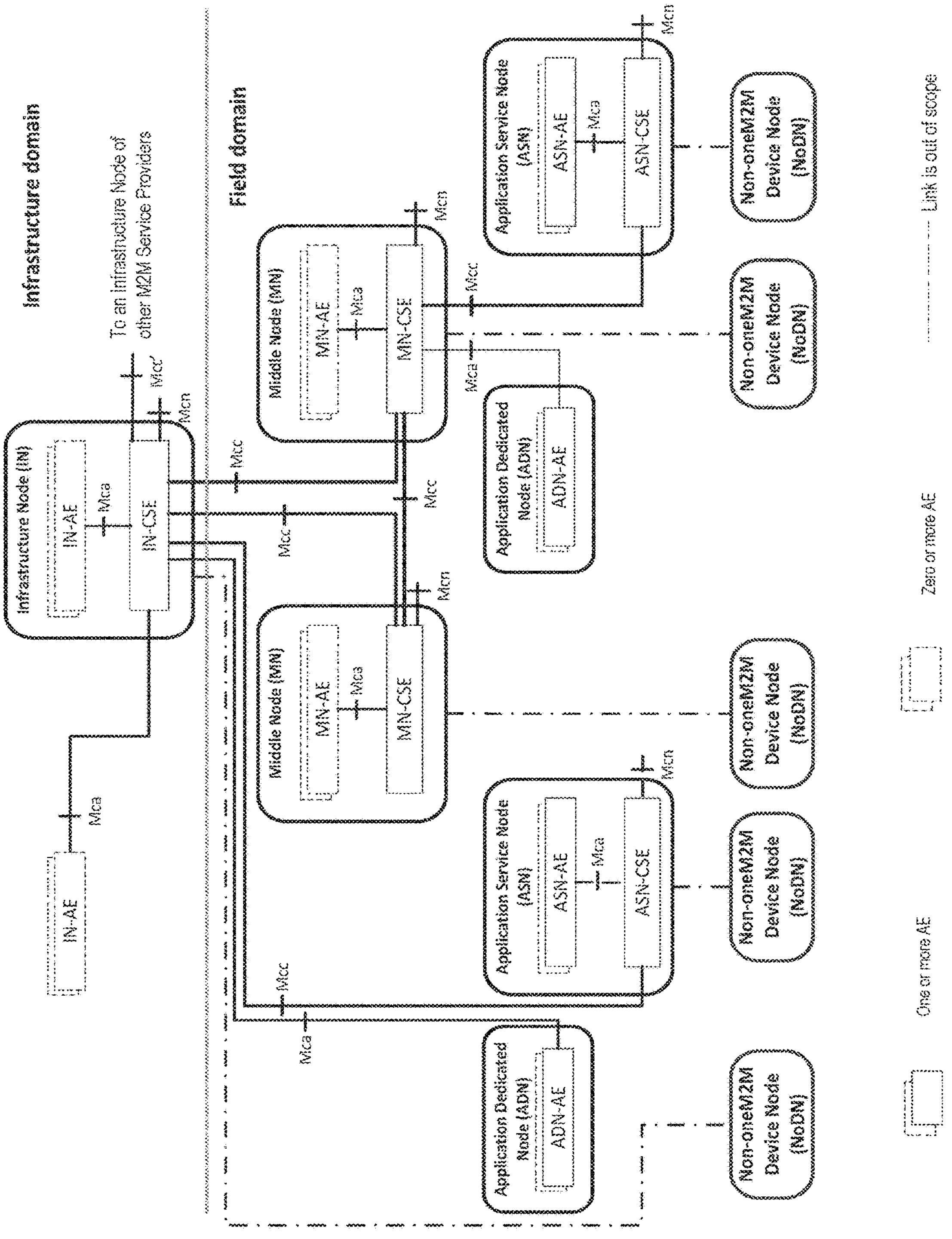
FIG. 5 illustrates example configurations supported by oneM2M.

In large scale M2M/IoT (hereinafter "IoT") deployments, managing relationships between IoT entities such as devices, applications and users can be complex and difficult. Some examples of relationships may include, but are not limited to, managing which devices and/or applications are compatible with one another, which devices and/or applications have dependencies on one another, or which devices and/or applications have an affiliation with one or more users. For example, compatibility may be defined to mean that devices may send messages to one another with a protocol or message format translation, dependency may be defined to mean that one device is not fully functional without another device, and affiliation may be defined to mean that two devices are owned by the same organization.

Traditionally, relationships between IoT entities are defined and configured by a user. This may be performed by the user leveraging an application developed by a device manufacturer (or a third party application developer) to configure the relationships between IoT devices. For example, a smart home device may be bundled with an application developed by a manufacturer that a customer may use to configure the device when deploying the device in a home. Users may leverage such applications to configure both individual smart home devices and groups of similar smart home devices. The configuration process may typically involve one or more users defining relationships between devices. These relationships may define which smart devices control other smart devices and the way in which devices may be controlled. For example, a configuration application may enable users to configure which smart light bulbs in their homes are controlled by a button that is pushed or a voice command that is issued to a smart light switch device. Likewise, the configuration application may enable users to also configure the corresponding action that is performed on the smart light bulbs when the command is issued by the smart light switch, such as turn on/off, dim, change the color or blink the lights, for example.

The use case described above is a very common one, wherein a user with the assistance of an application plays an integral role in the configuration of relationships between IoT devices. In this type of small scale IoT deployment, the relationships tend to be trivial and involve only a few devices that have longstanding relationships that persist for long durations of time (e.g., years) without the need for modification. Hence, this type of user configuration is adequate.

For larger scale IoT deployments (e.g., smart city), managing relationships between IoT devices can be much more complex than smaller scale IoT deployments. Larger scale IoT deployments have increased complexity that may be attributed to several factors such as a large number of devices, different types of devices and their manufacturers, public/multi-tenant devices, and the temporal or spatial nature of relationships that exist between IoT devices in such a large deployment. In these types of large scale IoT deployments, relying on users to manually configure relationships between devices using applications built to only configure types of devices from specific manufacturers is not an effective and scalable approach. In addition, managing short-lived and dynamic relationships between IoT devices by a user is not only burdensome for the user, but also may not be optimal from a system scalability perspective.

A use case regarding a smart city exemplifies the above-described problems. Take for example, a smart city that has built a smart public transportation system that comprises unmanned vehicles that may dynamically connect to and disconnect from one another to form trains of unmanned vehicles. Such connection and disconnection may be based on situational context such as the following: vehicles located in the same vicinity and traveling in the same direction as one another; passengers in one vehicle needing to meet up with other passengers in other vehicles; passengers or goods needing to be transferred between vehicles; and/or one vehicle requiring fuel (e.g., battery) and other vehicles having spare fuel that can be shared. The city may ultimately like to manage the dynamic connecting and disconnecting of the vehicles using their IoT SL platform. However, the city's IoT platform lacks the capability to configure and control relationship criteria for the unmanned vehicles that comprise the smart transportation system. For example, the city's IoT platform lacks the capability to define criteria such as the following: Compatibility Relationship Criteria; State Relationship Criteria; Location Relationship Criteria; and Schedule Relationship Criteria.

Compatibility Relationship Criteria may define the makes and models of unmanned vehicles that are compatible and able to connect and disconnect with one another.

State Relationship Criteria may define state-based criteria for when vehicles should connect or disconnect. Examples of such criteria may include criteria that define the threshold for when a vehicle's battery is considered low and needs charging and the threshold for when a vehicle's battery is considered high enough such that vehicles may connect and share their battery charge or criteria that define when one vehicle is at max occupancy and other vehicles are not such that the vehicles may connect and exchange passengers.

Location Relationship Criteria may define criteria for when vehicles should connect based on current location (e.g., less than 1 mile) and/or intermediate way point or destination locations.

Schedule Relationship Criteria may define criteria for when vehicles should connect based on their schedules. An example of such criteria may include two vehicles traveling in the same direction at similar times.

The capabilities and example embodiments described herein may provide solutions to the above-described problems, among others. Systems and methods are described to automate managing of relationships between IoT entities (e.g., devices, apps, users) and offloading the burden of managing these relationships from users. A Relationship Management Service is described to perform these capabilities and functions.

An RM Service may provide several functions. The RM Service may be configured with RM Policies that define relationship management rules that the RM Service may use to manage relationships between IoT entities. The RM Service may manage different types of relationships between IoT entities such as relationships based on functional compatibilities between IoT entities, functional dependencies between IoT entities, conditional state of IoT entities, users affiliated with IoT entities, locations of IoT entities, and schedules of IoT entities. The RM Service may trigger the autonomous establishment, modification, and tear-down of relationships between IoT entities based on RM Trigger Criteria defined by RM Policies. For the RM Service to establish and maintain a relationship between IoT entities, the specified RM Trigger Criteria defined within the RM Policy should be met. If the RM Trigger Criteria are not met, then the SL may not establish a new relationship and may tear-down an existing relationship, if one exists. The RM Service may dynamically collect RM Context during normal SL operation (i.e., during the processing of incoming requests and outgoing responses to/from IoT entities). The RM Service may determine which SL context is relative to RM based on the RM Trigger Criteria defined in the RM Policies it is configured with. The RM Service may then analyze this context against RM Policies to detect opportunities to trigger the autonomous establishment, modification, or tear-down of relationships between IoT entities. During the management lifecycle of a relationship, the RM Service may perform RM Actions. An RM Policy may define separate sets of RM Actions that the RM Service may perform. These RM Actions may be triggered by corresponding RM Action Trigger Conditions or when the RM Service triggers the establishment, modification, or tear-down of a relationship between IoT entities based on RM Trigger Criteria and RM Context. The RM Service may maintain RM State within the SL that the RM Service and other IoT entities may use to keep track of relationships between IoT entities.

Figure 6:
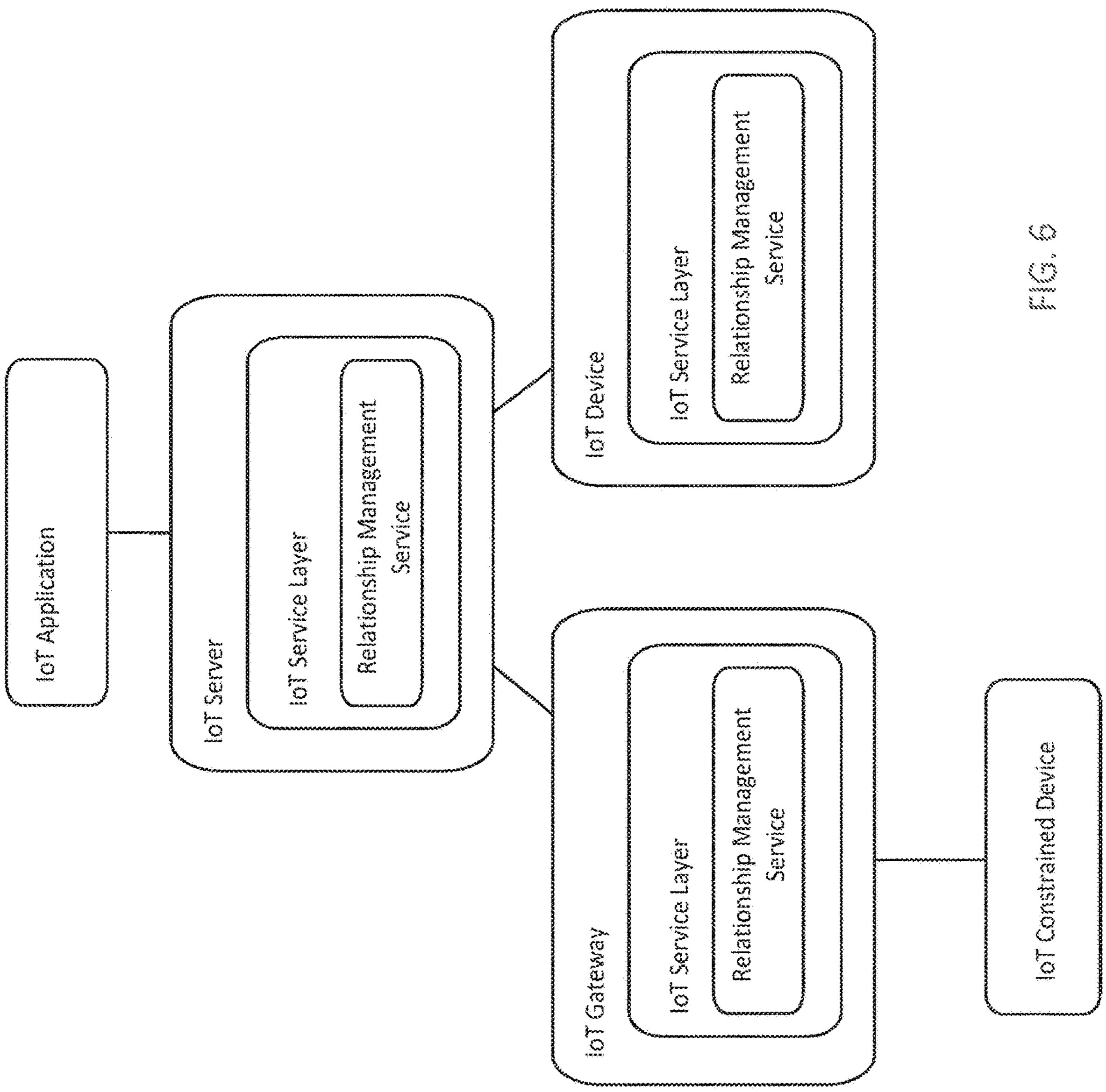
FIG. 6 illustrates an example of a Relationship Management Service (RM Service) Deployment.

An SL may support a Relationship Management Service (RM Service) capable of the autonomous establishment, modification, and tear-down of relationships between IoT entities. The types of IoT entity relationships that an RM Service may manage may include, but are not limited to, relationships based on functional compatibilities between IoT entities, functional dependencies between IoT entities, conditional state of IoT entities, users affiliated with IoT entities, locations of IoT entities, and schedules of IoT entities. An RM Service may be supported as a service within an IoT SL that is hosted on a server, gateway, or device, as shown in FIG. 6.

Figure 7:
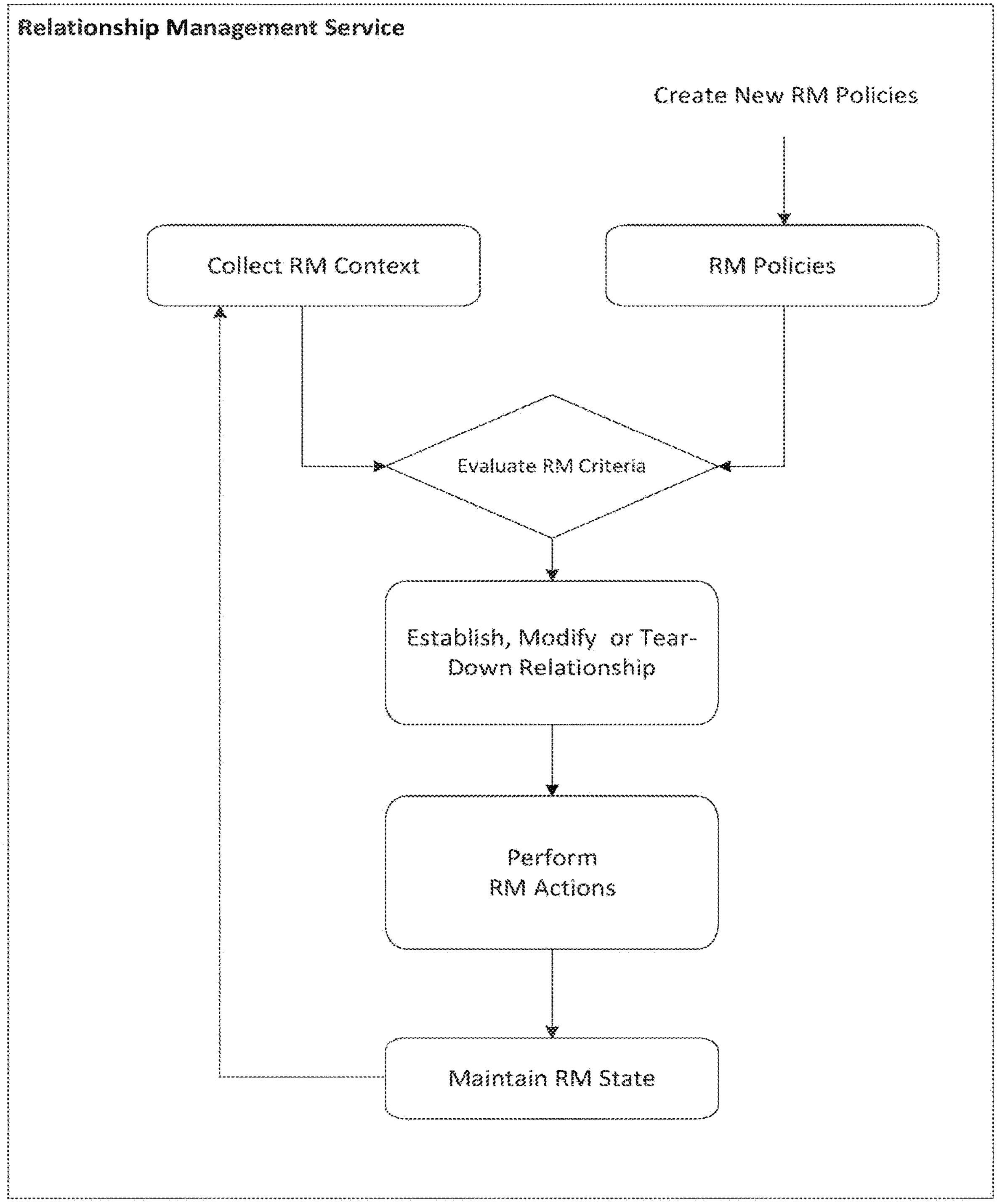
FIG. 7 illustrates an example flow diagram of an RM Service.

As shown in FIG. 7, the RM Service may be configured with RM Policies that define relationship management rules that the RM Service may use to manage establishment, modification, and tear-down of relationships between IoT entities. The RM Service may dynamically collect RM Context that is relevant to the management of relationships between IoT entities. The RM Service may then analyze this context against RM Policies to determine opportunities to trigger the autonomous establishment, modification, or tear-down of relationships between IoT entities. RM Policies may include RM Trigger Criteria which may be used by the RM Service to determine the type of relationship to establish, modify, or tear-down. The RM Service may maintain RM State for the relationships it manages between IoT entities. Such an RM State may be maintained within the SL such that the RM Service and other IoT entities may use the state to keep track of the relationships. Once relationships between IoT entities have been established by the RM Service, the RM Service may support RM Actions that provide value-add functionality to the IoT entities involved in the relationships. The types of RM Actions that the RM Service may perform include, but are not limited to, relationship-based group management, event management, credential management, authorization management, request handling, QoS management, and schedule management.

Figure 8:
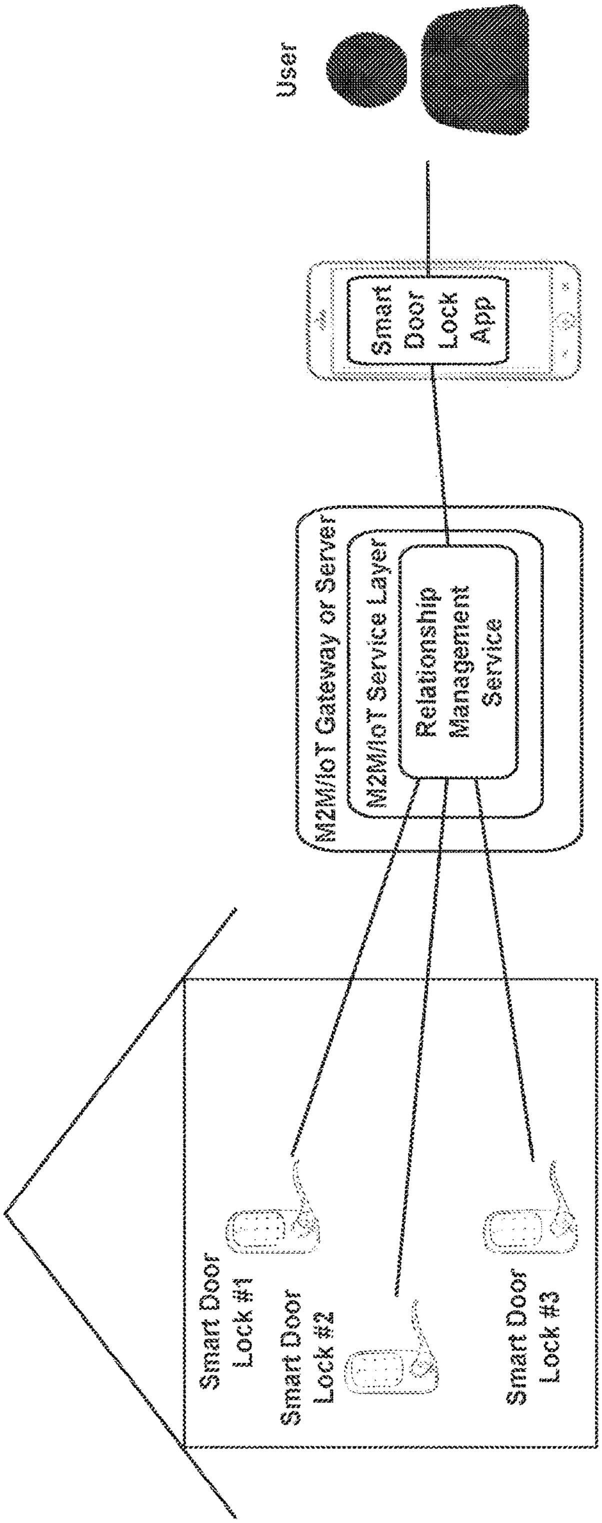
FIG. 8 illustrates an example use case for an RM Service.

FIG. 8 provides an example of an RM Service use case. In this use case, the RM Service may determine several types of relationships between a set of smart door locks installed in a user's home and a smart door lock app hosted on the user's smart phone. Both the smart door locks and the app may be registered to a common SL that supports an RM Service, as shown in FIG. 8. The RM Service may determine and establish a functional compatibility relationship between the door locks and app that work together, a functional dependency relationship of the door locks on the app that controls them, a user relationship between the smart door locks and app associated with the same user, and a location relationship between the smart door locks that are installed in the user's home. Based on these established relationships, the RM Service may provide relationship-based capabilities to the smart door locks, app, and user. For example, the RM service may determine, based on a configured policy, that the home automation devices that are in the home should be associated with the user. Based on this information, the RM Service may automate the configuration of security credentials onto the door locks and app, configure SL access control policies to authorize only the user's app to lock/unlock the door locks, and create an SL group comprising the door locks such that the user may lock/unlock one or more of the door locks via the issuance of a single request. In doing so, the RM Service (via its relationship-based capabilities) automates and offloads the burden of configuring and managing the door locks and app for the user.

Continuing with the example shown in FIG. 8, a request may be initiated by the RM Service to trigger the door locks and app involved in a relationship to enroll with a service provider, bootstrap SL credentials, establish a network connection to the SL, register to the SL, and/or perform a specified request on a specified SL resource. Similarly, a request may also be initiated by the RM Service to create, bootstrap, refresh, or revoke SL credentials for the door locks and app involved in a relationship. Such SL credentials may be used by the door locks and app to authenticate and establish a secure and trusted relationship with the SL itself and/or with other IoT entities involved the relationship.

An RM Service may support RM Capabilities that are used to autonomously establish, modify, and tear-down relationships as well as provide value-add functionality to IoT entities involved in relationships. The RM Service may support RM Capabilities such as, but not limited to, one or more of the following capabilities.

An RM Service may be configured with RM Policies that may be used to manage the establishment, modification, and tear-down of relationships between IoT entities.

An RM Service may autonomously establish, modify, and tear down different types of relationships between IoT entities based on the dynamic collection and evaluation of RM Context against RM Trigger Criteria defined within RM Policies.

An RM Service may be configured with RM Actions and RM Trigger Criteria that define the if/when the RM Service performs the RM Actions. For example, when establishing, modifying, or tearing down relationships between IoT entities, an RM Service may perform RM Actions defined by RM Policies.

An RM Service may manage the creation, configuration, and tear-down of groups of IoT entities based off one or more relationships between IoT entities and the definition of RM Actions defined within RM Policies.

An RM Service may send notifications to IoT entities involved in relationships or IoT entities that are interested in SL relationships if/when a relationship is established, modified, or torn-down. The notifications may be sent as a result of subscriptions that the RM Service creates based on RM Actions defined within RM Policies.

An RM Service may send a request to trigger an IoT entity involved in a relationship to have the IoT entity enroll with a service provider, bootstrap SL credentials, establish a network connection to the SL, register to the SL, and/or perform a specified request on a specified SL resource. The requests may be initiated as a result of RM Actions defined within RM Policies.

An RM Service may send a request to create, bootstrap, or revoke SL credentials for one or more IoT entities involved in a relationship. These SL credentials may be used by the IoT entities to authenticate and establish a secure and trusted relationship with the SL itself and/or with the other IoT entities involved the relationship. The requests may be initiated as a result of RM Actions defined within RM Policies.

An RM Service may initiate a request to the SL, on behalf of IoT entities involved in a relationship, to CREATE, RETRIEVE, UPDATE, or DELETE one or more resources hosted by the SL or an IoT entity. The requests may be initiated as a result of RM Actions defined within RM Policies.

An RM Service may initiate a request to create, update, or delete a subscription to an SL resource if/when a relationship is established, modified, or torn-down between IoT entities, respectively. The requests may be initiated as a result of RM Actions defined within RM Policies.

An RM Service may initiate a request to create, update, or delete an SL access control policy if/when a relationship is established, modified, or torn-down between IoT entities, respectively. The requests may be initiated as a result of RM Actions defined within RM Policies.

An RM Service may initiate a request to configure, re-configure, or delete Quality of Service (QOS) policies and/or parameters in an underlying communications network that interconnects IoT entities if/when a relationship is established, modified, or torn-down between IoT entities. The requests may be initiated as a result of RM Actions defined within RM Policies.

An RM Service may initiate a request to configure, re-configure, or delete schedule related policies and/or parameters associated with IoT entities if/when a relationship is established, modified, or torn-down between IoT entities. A schedule may control the times in which an IoT entity is connected to the network and available for communication and/or the times in which the IoT entity performs a certain operation (e.g., the time a switch is turned on/off). The requests may be initiated as a result of RM Actions defined within RM Policies.

An RM Service may allow users to explicitly define and create their own relationships via the capabilities of the RM Service. The RM Service may then manage these relationships on behalf of the user.

As described, the above example capabilities may rely on relationship management policies (RM Policies).

An RM Service may be configured with RM Policies that define relationship management rules that the RM Service may use to manage establishment, modification, and tear-down of relationships between IoT entities. Such rules may be defined via RM Policy attributes such as, but not limited to, those proposed in Table 1. It is understood that an RM Policy may comprise one or more data structures to store such attributes.

TABLE 1

Relationship Management (RM) Policy

| Attribute | Description |
|---|---|
| Relationship Type | The type of Relationship applicable to this RM Policy. Examples may include a location, information sharing, master/slave, control, schedule, or semantic based relationship between IoT entities. |
| RM Trigger Criteria | Conditions to be met for the RM Service to trigger the establishment, modification, or tear-down of a relationship between the applicable IoT entities. For example, for a location based relationship, the RM Trigger Criteria may define a location range to be created or maintained for the relationship to continue, entities may need to be contained in the same geo-fence., be associated with the same user, use a common protocol, etc. |
| RM Action Trigger Conditions | A list of one or more actions and their corresponding trigger conditions. The RM Service may perform an action if/when the trigger condition is met.<br>Example RM Action trigger conditions that the RM Service may support include:<br>The RM service may initiate a specified type of SL request (e.g., on one or more SL entities)<br>The RM service may initiate a specified type of SL operation (e.g., initiate the creation of a new SL security credential)<br>Example trigger conditions that the RM may support include:<br>Registration of an IoT Entity that is of a certain type, supports certain functionality, comes from a certain manufacturer, supports certain protocols, is associated with a certain user, etc.<br>When a specified type of relationship is established, modified, or torn-down<br>When a relationship between specified participants or certain types of participants is established, modified, or torn-down<br>When a specified relationship or type of relationship exists and one or more additional specified conditions exist (e.g., relationship participant is in a certain functional state) |
| RM Actions | A list of one or more SL actions that should be taken when the RM Action Trigger Conditions have been met. Alternatively, this may comprise a list of one or more links to SL actions defined and hosted elsewhere in the system. Example actions that the RM Service may perform when modifying a relationship may include:<br>The RM service may initiate a specified type of SL request (e.g., on one or more SL entities)<br>The RM service may initiate a specified type of SL operation (e.g., initiate the creation of a new SL security credential) |
| RM Policy Creator | The identifier of the IOT entity that created the RM Policy. |
| Links | A link to one or more other RM Policies that are aggregated with this policy to form a single policy. |

The RM Service may manage different types of relationships between IoT entities. An RM Policy may identify a relationship that the RM Service will manage. RM Trigger Criteria defined within the RM Policy may be used by the RM Service to determine whether a specified type of relationship may be established, modified, or torn-down between IoT entities.

Supported Relationship Types may include, but are not limited to, one or more of the following: Functional Compatibility Relationship; Functional Dependency Relationship; Functional State Relationship; User Relationship; Location Relationship; Schedule Relationship; Semantic Relationship; Service Subscription Relationship; Proxy Relationship; Route Relationship; and Sequential Relationship.

A Functional Compatibility Relationship may be a relationship that is defined by the functional compatibility of IoT entities based on their functional types and capabilities. For example, smart light switches built by different manufacturers may have a compatibility relationship because they are all light switches that may be used to control smart light bulbs or are capable of communicating with the same protocols or message formats.

A Functional Dependency Relationship may be a relationship that is defined by the functional dependency of an IoT entity on one or more other IoT entities based on their functional types and capabilities. For example, a smart light bulb may have a dependency relationship on a smart light switch used to control the smart light bulb.

A Functional State Relationship may be a relationship that is defined by a past or current functional state of one or more IoT entities. For example, all smart light bulbs that are currently lit may have a state relationship with one another.

A User Relationship may be a relationship that is defined by the affiliation of IoT entities with a common user. For example, all smart light switches that a user has privileges to control may have a user relationship with one another.

A Location Relationship may be a relationship that is defined by the location of IoT entities with respect to one another and with respect to a specified range or boundary. For example, smart light bulbs and switches installed within the same room may have a location relationship with one another.

A Schedule Relationship may be a relationship that is defined by the respective schedules of IoT entities. For example, light bulbs scheduled to turn on/off at the same time of day may have a schedule relationship.

A Semantic Relationship may be relationship between IoT entities that is defined based on their semantic descriptions (i.e., a semantic ontology defines a relationship between IoT entities). For example, a semantic ontology may be used to describe the semantic relationship that a light switch controls a light bulb.

A Service Subscription Relationship may be relationship that is defined by a common service subscription shared between IoT entities. For example, smart light bulbs and switches enrolled to the same IoT Service Provider by the same Service Subscriber may have a service subscription relationship.

A Proxy Relationship may be relationship between a group of IoT entities and another IoT entity that acts as a proxy for the group of IoT entities.

A Route Relationship may be a relationship among a set of IoT entities that are located along a pre-defined route (e.g., PA turnpike 1-276 segment between exit 309 and 333). Such a relationship may be especially useful for the Smart Public Transportation Embodiment described below.

A Sequential Relationship may be a relationship among a set of IoT entities that exist in a process with sequential dependency (e.g., an assembly line in a factory).

The RM Service may trigger the autonomous establishment, modification, and tear-down of relationships between IoT entities based on RM Trigger Criteria (or Trigger Conditions) defined by RM Policies. For the RM Service to establish and maintain a relationship between IoT entities, a specified RM Trigger Criteria defined within the RM Policy should be met. If the RM Trigger Criteria are not met, then the SL may not establish a new relationship and may tear-down an existing relationship if one exists. An RM Policy may define different types of RM Trigger Criteria that may include, but are not limited to, one or more of the following: Compatibility Relationship Criteria; Dependency Relationship Criteria; State Relationship Criteria; User Relationship Criteria; Location Relationship Criteria; Schedule Relationship Criteria; Semantic Relationship Criteria; Service Subscription Relationship Criteria; Proxy Relationship Criteria; Route Relationship Criteria; and Sequential Relationship Criteria.

Compatibility Relationship Criteria may define IoT entities that are functionally compatible with each other. For example, RM Trigger Criteria may refer to an industry standard and/or a product profile associated with that standard that may be used to compare and determine if IoT entities are functionally compatible with one another (e.g., a compatibility relationship may be established between Bluetooth smart light bulbs even if they are manufactured by different vendors). In another example, RM Trigger Criteria may define SL conditions such as the occurrence of the same type of SL request message being sent to two or more IoT entities on a repeated basis. In this case, the RM Service may determine that IoT entities are compatible based on their abilities to process the same type of requests or message formats.

Dependency Relationship Criteria may define IoT entities that have a functional dependency on one or more other IoT entities. For example, this criteria may refer to an industry standard and/or a product profile associated with that standard that may be used by the RM Service to determine if IoT entities are dependent on one another (e.g., Bluetooth smart light bulbs are dependent on Bluetooth smart light switches). In another example, RM Trigger Criteria may define SL conditions such as the occurrence of the same IoT entity sending SL request messages to another IoT entity on a repeated basis. In this case, the RM Service may detect a dependency relationship between the IoT entities. By detecting that two IoT entities have a dependency, the service layer may generate warnings to the service layer owner, or operator, if particular devices are brought offline. For example, a service layer may inform a gateway owner that a door lock may soon loose functionality because of low battery and that this will impact the performance of the home security system.

State Relationship Criteria may define IoT entities that have a state relationship with one another. In one embodiment, name(s) and value(s) of specified IoT entity attribute(s) may be used as criteria to determine if there is a state relationship between IoT entities (e.g., multiple Bluetooth smart light bulbs are lit).

User Relationship Criteria may define IoT entities that have a user relationship with one another. For example, identifiers of user(s) and IoT entity(s) that user(s) are affiliated with may be used as criteria to determine if there is a user relationship between IoT entities (e.g., multiple Bluetooth smart light switches may be controlled by the same user).

Location Relationship Criteria may define IoT entities that have a location relationship with one another. For example, a specified location may be used as a criterion to determine if there is a location relationship between IoT entities (e.g., multiple Bluetooth smart light bulbs installed in the same room).

Schedule Relationship Criteria may define IoT entities that have a schedule relationship with one another. For example, a specified schedule may be used as criteria to determine if there is a schedule relationship between IoT entities (e.g., multiple Bluetooth smart light bulbs turn on and/or off at certain times). In another example, a specified schedule may provide an indication that when two devices communicate they may, or may not, be required to be simultaneously wake. For example, the devices may not be required to be awake at the same time if the system (e.g., gateway (GW)) is able to buffer messages that are sent between the devices.

Semantic Relationship Criteria may define IT entities that have a semantic relationship with one another. For example, a specified semantic description/ontology may be used as criteria to determine if there is a semantic relationship between IoT entities (e.g., a semantic ontology may define that a smart light switch is used to control the state of a smart light bulb).

Service Subscription Relationship Criteria may define IoT entities that have a service subscription relationship with one another. For example, a specified service subscriber may be used to determine if IoT entities have the same service subscriber and therefore a service subscriber relationship (e.g., all the smart light bulbs and switches have been enrolled to the same IoT Service Provider by the same Service Subscriber).

Proxy Relationship Criteria may define IoT entities that have a proxy relationship with one another. For example, a list of IoT entities registered to another IoT entity may be used as criteria to determine if there is a proxy relationship between IoT entities.

Route Relationship Criteria may define IoT entities that have a route relationship with one another. For example, a route may be specified that may include waypoint definitions. This route may be used as criteria to determine if IoT entities have a route relationship with one another.

Sequential Relationship Criteria may define IoT entities that have a sequential relationship with one another. For example, a pattern of operations that are performed by a set of IoT entities may be defined. This pattern may be used to define a sequence relationship between IoT entities.

The different types of RM Trigger Criteria defined above may include elements such as but not limited to the elements defined in Table 2.

TABLE 2

Relationship Management (RM) Criteria

| Attributes | Description |
|---|---|
| IOT Entities | Unique Identifiers of IoT entities that may be candidates to take part in a relationship defined by this RM Trigger Criteria. The RM Service may limit the establishment of relationships defined by this set of RM Trigger Criteria to the candidate IoT entities defined by this attribute. |
| Manufacturer | Identifiers of manufacturers of IOT entities that may be used to determine if compatibility and dependency relationships exist between IoT entities. |
| Profile | Identifiers of profiles that may be used to distinguish different types of IoT entities. Profiles may be used to determine if compatibility and dependency relationship exists between IoT entities (e.g., device or application type). |
| Standards | Identifiers of standards that may be used to determine if compatibility and dependency relationships exist between IoT entities. |
| Attribute Names & Values | Attribute name & value information that may be used to compare against the names and values of attributes of IoT entities to determine if a state relationship exists between IoT entities. |
| Users | Identifiers of Users that may be used to determine if a user relationship exists between IoT entities. |
| Schedule | Schedule information that may be used to compare against the schedules of IoT entities to determine if a schedule relationship exists between IoT entities. |
| Location | Location information that may be used to compare against the locations of IoT entities to determine if a location relationship exists between IoT entities. |
| Semantic Description | Semantic description of IoT entities that may be used to semantically describe IoT entities and a semantic relationship that exists between IoT entities. |
| Service Subscribers | Identifier of a Service Subscribers that may be used to determine if a service subscriber relationship exists between IoT entities. |

During the management lifecycle of a relationship (i.e., establishment to modification to tear-down), the RM Service may perform RM Actions. An RM Policy may define separate sets of RM Actions that the RM Service may perform. An RM Action may define an action that is performed if/when corresponding trigger conditions, as described herein, for the action have been met. In addition, the RM Service may support a native set of RM Actions that it may perform that are independent of those defined in RM Policies.

An RM Policy may include one or more RM Actions that the RM Service may perform. An RM Action may also include a trigger condition. If/when the RM Service detects that the trigger condition has been met for an action, the RM Service may perform the action. An individual RM Action may involve the RM Service initiating a request with a defined operation that may be targeted towards an IoT entity or another service hosted by the SL. Certain types of RM Actions may involve the RM Service performing requests on behalf of the IoT entities involved in a relationship. Such performing may reduce overhead and burden on IoT entities, relieving them from having to perform these requests themselves. Other types of RM Actions performed by the RM Service may provide additional value-add services to the SL itself. The RM Service may leverage other services hosted within the SL when performing these actions. For example, the RM Service may initiate a request to another service to have it send a trigger to a first IoT entity involved in a relationship with another IoT entity to have the first IoT entity connect and enroll with a service provider and/or register to the SL.

The types of RM Actions that the RM Service performs may include, but are not limited to, one or more of following. The RM Service may perform these actions when the trigger conditions specified for these RM Actions have been met. The trigger conditions may be individual customized and configured per RM Action.

A request may be initiated by the RM Service to send a notification to an IoT entity if/when a specified trigger condition is met (e.g., relationship is established, modified, or torn-down between IoT entities), wherein the notification may include RM State data such as, but not limited to, the following:

- a list of identifiers of the IoT entities involved in the relationship. Such a list may further include what protocols the IoT entities use to communicate, what channels (e.g., frequencies) they use to communicate, what messaging protocols/formats (e.g., JSON, CBOR) they use to communicate, and/or a reference ID or key that may be used to establish commination with the one or more IoT entities;
- an establishment time of the relationship;
- a planned tear-down time of the relationship;
- an identifier of the RM Policy used to create the relationship; and.

one or more identifiers of SL resources that the RM Service created because of the relationship establishment (e.g., group, schedule, location, and subscriptions resources).

A request may be initiated by the RM Service to trigger an IoT entity involved in a relationship to enroll with a service provider, bootstrap SL credentials, establish a network connection to the SL, register to the SL, or perform a specified request on a specified SL resource.

A request may be initiated by the RM Service to create, bootstrap, refresh, or revoke SL credentials for one or more IoT entities involved in a relationship. These SL credentials may be used by the IoT entities to authenticate and establish a secure and trusted relationship with the SL itself and/or with the other IoT entities involved the relationship.

A request may be initiated by the RM Service on behalf of IoT entities involved in a relationship if/when specified trigger conditions have been met, to CREATE, RETRIEVE, UPDATE, or DELETE one or more resources hosted by the SL or an IoT entity.

A request may be initiated by the RM Service to create, update, or delete a group of IoT entities using an SL resource if/when specified trigger conditions have been met (e.g., a relationship is established, modified, or torn-down between IoT entities, respectively). The RM Service may keep the members of the SL group updated to reflect the IoT entities involved in the relationship.

A request may be initiated by the RM Service to create, update, or delete a subscription to an SL resource if/when specified trigger conditions have been met (e.g., a relationship is established, modified, or torn-down between IoT entities, respectively). The RM Service may keep the subscription updated to reflect the IoT entities involved in the relationship that are to receive notifications regarding any changes that occur to the subscribed to SL resource.

A request may be initiated by the RM Service to create, update, or delete an SL access control policy if/when specified trigger conditions have been met (e.g., a relationship is established, modified, or torn-down between IoT entities, respectively). The access control policy may be configured with privileges that allow IoT entities involved in the relationship to access each other's resources (i.e., data/data structures) hosted in the SL and/or send requests directly to one another. The RM Service may keep the access control policy updated to reflect the IoT entities involved in the relationship and the operations required. The privileges may be defined by the RM Action itself, the RM Service may derive the privileges based on examining RM Context (e.g., IoT entity profile information, IoT entity's level of trust with other IoT entities, existing access control policies and privileges, etc.), or the RM Service may consult with other IoT entities to derive the privileges that it may configure in the access control policy.

A request may be initiated by the RM Service to configure, re-configure, or delete Quality of Service (QOS) policies and/or parameters in an underlying communications network that interconnects IoT entities if/when specified trigger conditions have been met (e.g., a relationship is established, modified, or torn-down between IoT entities).

A request may be initiated by the RM Service to configure, re-configure, or delete schedule policies and/or parameters of IoT entities if/when specified trigger conditions have been met (e.g., a relationship is established, modified, or torn-down between IoT entities). A schedule may control times in which an IoT entity is connected to the network and available for communication or times in which the IoT entity performs a certain operation (e.g., the time a switch is turned on/off).

A request may be initiated by the RM Service to create or update a charging recording to record the RM actions. The charging record may be used to record that a relationship was formed, updated, or deleted. A user, or subscriber, may be subsequently charged a fee based on the charging record.

The RM Service may dynamically collect context of the IoT entities related to RM during normal SL operations (i.e., during the processing of incoming requests and outgoing responses to/from IoT entities). The RM Service may determine which context is relative to RM based on the RM Trigger Criteria defined in the RM Policies it is configured with. The RM Service may then analyze this context against RM Policies to determine opportunities to trigger the autonomous establishment, modification, or tear-down of relationships between IoT entities.

RM Context may comprise information that may be analyzed by the RM Service (e.g., against RM Policies) to detect whether to trigger the establishment, modification, or tear-down of a relationship between IoT entities. RM Context may include, but is not limited to, one or more of the following: Compatibility Context; Dependency Context; State Context; User Context; Location Context; Schedule Context; Service Subscription Context; Semantics Context; Proxy Context; Route Context; and Sequence Context.

A Compatibility Context may comprise information that may be used by the RM Service to determine compatibilities between IoT entities. Compatibility Context may include but is not limited to one or more of the following: Manufacturer Information (e.g., manufacturer name, model and serial number); Product Profile Information (e.g., type of device or application, for example what communication and messaging protocols or formats are supported); Interface definition (e.g., schema definitions, supported protocols); Existing SL meta information (e.g., existing SL group information); and Capability information for IoT entities (e.g., capabilities or features).

A Dependency Context may comprise information that may be used by the RM Service to detect dependencies that IoT entities have on other IoT entities. Dependency Context may include a description of one or more required companion IoT entities that an IoT entity has a dependency on. Such a description may include information such as, but not limited to, one or more of the following: Manufacturer Information (e.g., manufacturer name, model and serial number); Product Profile Information (e.g., type of device or application, for example what communication and messaging protocols or formats are supported); Interface definition (e.g., schema definitions, supported protocols); Dependency profile or ontology information (e.g., device A is dependent on device B); Existing SL meta information (e.g., existing SL group information); and Capability information for IoT entities (e.g., capabilities or features).

A State Context may comprise information that may be used by the SL to determine the state of IoT entities. State Context may include, but is not limited to, one or more of the following: a state of one or more specified IoT entity resources and attributes.

A User Context may comprise information that may be used by the SL to associate IoT entities with users. User Context may include, but is not limited to, one or more of the following: SL meta information that may be used to associate users and IoT entities (e.g., user profile information configured at the time of enrollment or registration or sometime thereafter).

A Location Context may comprise information that may be used by the SL to determine the location of IoT entities. Location Context may include, but is not limited to, one or more of the following: past, current, or future planned location information provided by the IoT entity itself or by a third party.

A Schedule Context may comprise information that may be used by the SL to detect the schedules of IoT entities. Schedule Context may include, but is not limited to, one or more of the following: Availability schedules (e.g., sleep schedules); and Activity schedules (e.g., a sensor's reporting interval).

A Service Subscription Context may comprise information that may be used by the SL to associate IoT entities with a service subscription. Service Subscription Context may include, but is not limited to, one or more of the following: SL meta information that may be used to associate service subscriptions and IoT entities.

A Semantics Context may comprise information that may be used to detect semantic relationships. Semantic Context may include, but is not limited to, one or more of the following: semantic information (e.g., query semantic ontology and/or descriptor that describes one or more IoT entities and may be used to associate IoT entities automatically).

A Proxy Context may comprise information that may be used to detect proxy relationships. Proxy Context may include, but is not limited to, one or more of the following: information regarding which IoT entities have other IoT entities registered to them and which may function as a proxy on behalf of one or more types of functionality or messages.

A Route Context may comprise information that may be used to detect route relationships. Route Context may include, but is not limited to, one or more of the following: information describing a route such as location of route, way points along a route, type of participants making up a route or using a route; and information describing the status of a route (e.g., congested, non-congested, etc.). Such route information may be used as criteria to determine if IoT entities have a route relationship with one another.

A Sequence Context may comprise information that may be used to detect sequence relationships. Sequence Context may include, but is not limited to, one or more of the following: information describing or providing status about a sequence or pattern involving one or more IoT entities, such as for example, the sequence of IoT entities that are performing operations in a certain sequence with respect to one another and the status of such operations.

Once a relationship between IoT entities has been established, the RM Service may maintain an RM State within the SL that the RM Service and other IoT entities may use to keep track of the relationship. This RM State may store information about the relationship and may be maintained throughout the lifecycle of the relationship (i.e., establishment to modification to tear-down), until the relationship is torn-down by the RM Service.

An RM State may comprise attributes such as, but not limited to, the information proposed in Table 3. In one embodiment, the RM Service may create and maintain RM State within one or more SL resources. A SL resource tree may be created, updated, and deleted by the RM Service when a relationship is established, modified, and torn-down, respectively. Such an SL resource tree may contain information defined in Table 3. The RM Service may make the information about the relationships that it maintains available to be read by other services and IoT entities. This information may be made accessible via resource reads. For example, the content of Table 3 may be stored in a resource and represent a single relationship. The resource may be read by other services and IoT entities.

TABLE 3

Relationship Management (RM) State

| Attribute | Description |
|---|---|
| Relationship Type | The type of relationship. A relationship may be of a single type (e.g., location relationship) or may be a compound relationship wherein participants may have multiple relationships with one another (e.g., location and schedule relationships). State for the individual relationships of a compound relationship may be aggregated together and/or maintained separately with a link or reference to one another. |
| Relationship Participants | IoT entities involved in the relationship. For an IoT entity, at least the following information may be maintained:<br>Unique ID of the IoT entity<br>ID(s) of SL resource(s) representing IoT entity<br>Role that IoT entity has in the relationship (e.g., master, slave, etc.) |
| RM Policy(s) | A link to one or more RM Policies that the RM Service uses to establish, modify, or tear-down this relationship. |
| Associated SL Resources | Link(s) to SL resource(s) used by RM Service to manage this relationship. Some examples of different types of SL resources may include, but are not limited to, instances of group, subscription, access control policy, schedule, location, credential, and QoS resources. |
| Establishment Time | Time when relationship was established. |
| Tear-down Time | Time when relationship will be torn-down. |
| Last Modified Time | Time when the relationship was last modified. |
| Relationship Status | The state of a relationship (e.g., active or inactive). When a relationship is in the active/inactive state, the corresponding relationship-based SL capabilities associated with the relationship may be enabled/disabled accordingly by the RM Service. |
| Relationship Control | Used to control the status of a relationship.<br>For example, this attribute may be updated with values such as ACTIVATE and DEACTIVATE to change the status of a |

TABLE 3-continued

| Relationship Management (RM) State | |
|---|---|
| Attribute | Description |
| | relationship to active or inactive, respectively. This allows a relationship to be dynamically activated, deactivated, and then reactivated without having to tear-down and re-establish a relationship between IoT entities. |
| Relationship Candidates | List of IOT entities which are candidates to be included in the relationship. This allows for value-add services offered by RM/SL by allowing entities to be proposed (or self-proposed) to be included in the relationship. The Entity/application managing the relationship may then act upon to include the candidates in the Relationship. |
| Relationship History | History of the relationship (e.g., requests performed on or by the participants of the relationship or the amount of data produced or consumed by the participants). |

Figure 9A:
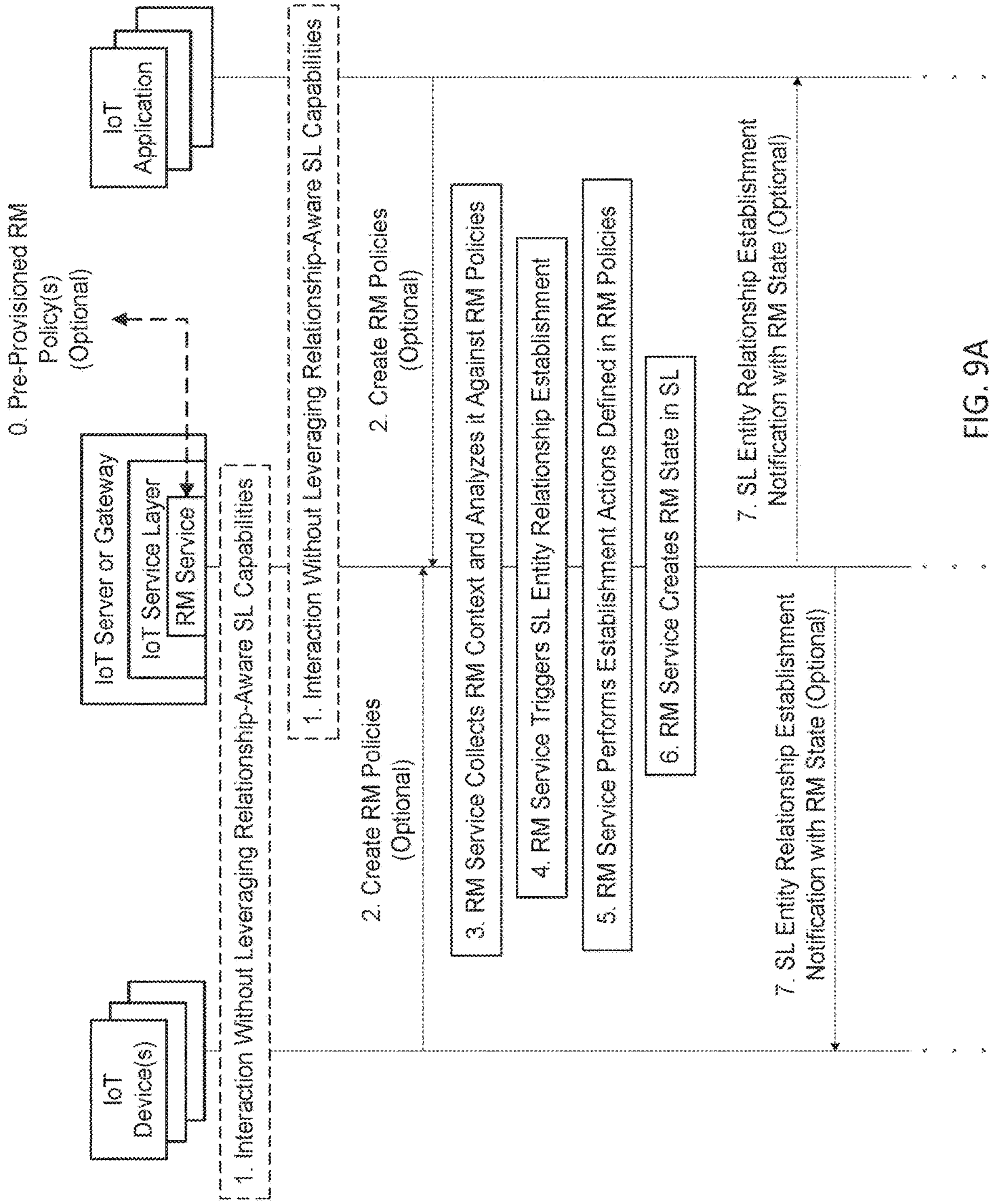
FIGS. 9A-B illustrate an example sequence diagram of RM Service processing.
Figure 9B:
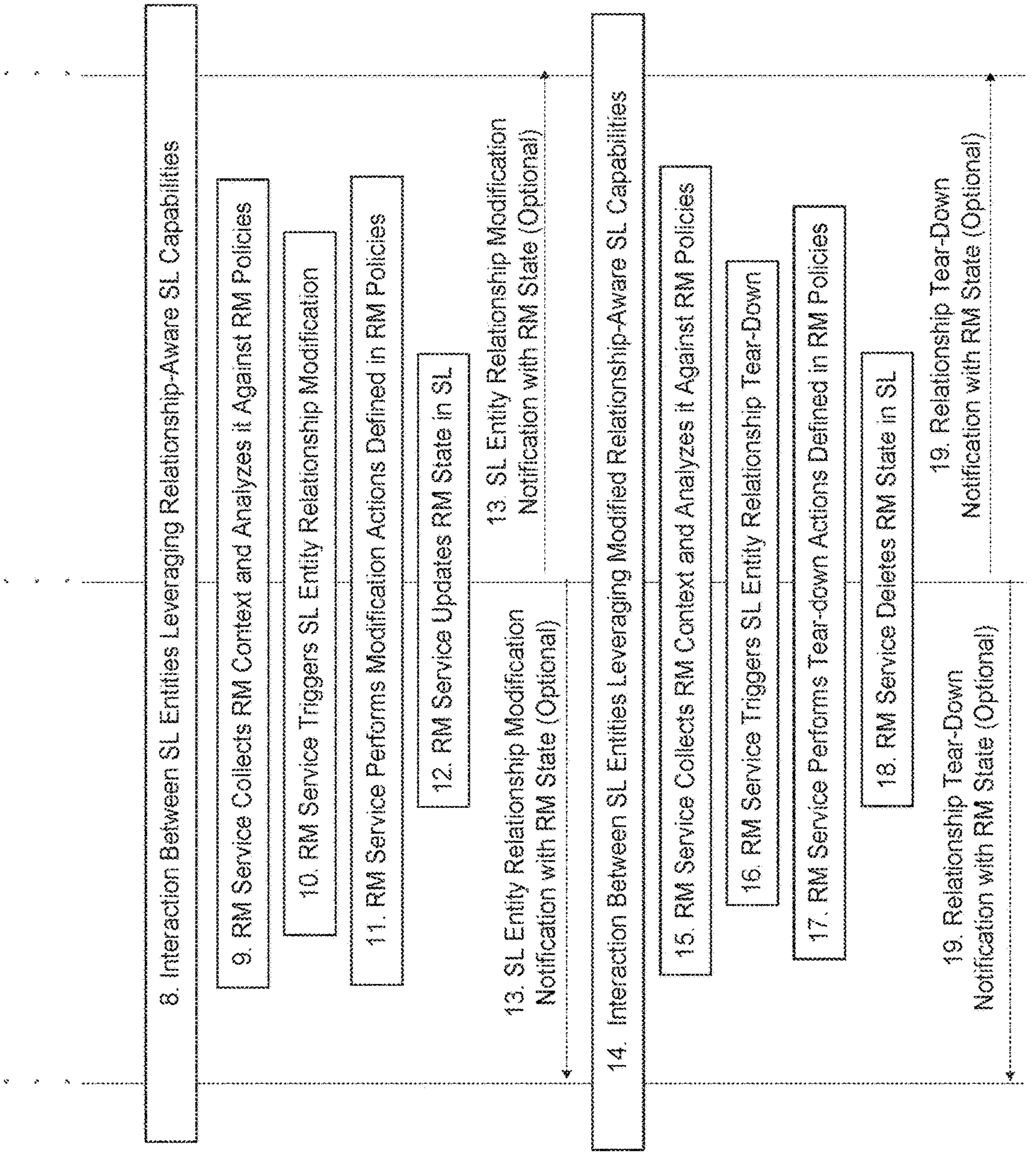

FIGS. 9A-B illustrate an example of an RM procedure involving an IoT SL that supports an RM Service and that is hosted on an IoT server or gateway. In FIGS. 9A-B, the RM Service manages relationships between IoT devices and applications that are registered to the IoT SL.

As shown as step 0, RM Policies containing rules that provide guidance to the RM Service for the establishment, modification, and tear-down of relationships between IoT entities may optionally be pre-provisioned into the RM Service of an SL. For example, RM Policies may be hard coded into the RM Service by a developer at the time of RM Service development, pre-configured into the RM Service at the time of deployment, or configured using out-of-band mechanisms by a service provider that owns and operates an RM Service within its service platform. Some examples of out-of-band mechanisms may include a management portal that exposes a graphical user interface (GUI) and may be used by a service provider to configure and manage its platform or a device management server that the service provider uses to push RM Policies to the RM Service in its service platform. Rules within RM Policies may include information such as the type of relationship applicable to the policy, RM Trigger Criteria that the RM Service may use to trigger the establishment, modification, and/or tear-down of relationships associated with this policy, and RM Actions that the RM Service may perform when establishing, modifying, or tearing down a relationship associated with this policy.

As shown as step 1, individual IoT entities (devices, applications, service subscribers, users, etc.) may individually communicate with the SL without established relationships between IoT entities and therefore without leveraging any relationship-based capabilities of the SL. For example, IoT entities may individually register to the SL and publish metadata that describes themselves to the SL (e.g., unique identifiers, type, manufacturer, location, user(s), schedule, etc.). IoT entities may also start publishing and consuming data to/from the SL.

As shown as step 2, individual IoT entities may send requests to the RM Service in the SL to create RM Policies comprising rules that provide guidance to the RM Service for the establishment, modification, and tear-down of relationships between IoT entities. Requests to create RM Policies may be issued by IoT entities at different times, such as for example, when a service subscriber enrolls, or when a device, application, or user performs SL registration to an SL, or sometime thereafter. Such requests may also be triggered by a user handling the device. For example, the user may use a GUI to configure information in the device and initiate the sending of a request to the GW requesting that a relationship be formed with certain devices.

At step 3, the RM Service may collect RM Context from the published metadata of the individual IT entities (e.g., devices) that have enrolled and registered to the SL and may also collect RM Context from SL requests that are issued and/or targeted towards the individual IoT entities. This step may also involve interaction with the IoT Devices and/or Applications, for example, the RM Service may also collect RM Context by other means, such as for example, periodically sampling the state of the IoT entities involved in a relationship or analyzing or detecting requests from the IoT devices. The RM Service may then analyze the RM Context and RM Trigger Criteria defined within RM Policies that have been created and configured within the RM Service. Based on the RM Trigger Criteria defined within the RM Policies, the RM Service may evaluate the RM Context it collects to determine whether any RM Trigger Criteria have been met to trigger the establishment of a relationship between applicable IoT entities.

At step 4, based on RM Trigger Criteria defined within an RM Policy, the RM Service detects that a relationship between IoT entities may be established. The RM Service may trigger and establish the type of relationship defined by the RM Policy by performing the RM Actions in Step 5, below. Alternatively, the RM Service may also allow an IoT entity (e.g., user app) to define and manually create a relationship between IoT entities. This may be done by configuring this relationship into the RM Service via an explicit request issued by an IoT entity (not shown in FIGS. 9A-B). Once created, the RM Service may then manage the relationship.

At step 5, based on RM Actions defined within an RM Policy, the RM Service may perform RM Actions when it establishes a relationship between IoT entities. Such RM Actions may comprise the RM Service performing requests on behalf of IoT entities involved in a relationship. The RM Service may also initiate requests to other services hosted within the SL to manage the relationship. The RM Service may initiate RM Actions such as, but not limited to, the following.

The RM Service may initiate the creation of an SL group resource and may configure the IoT entities involved in a relationship as members of such a group.

The RM Service may initiate the creation of an SL subscription on an SL resource and configure the SL to send notifications to IoT entity(s) that are involved in a relationship.

The RM Service may initiate the generation and bootstrapping of SL credentials to IoT entities involved in a relationship such that they may communicate securely with one another.

The RM Service may initiate creation and/or configuration of access control privileges on SL resources that may be affiliated with IoT entities involved in a relationship to allow access to these resources by these IoT entities.

The RM Service may initiate one or more SL requests targeting IoT entities involved in a relationship.

The RM Service may initiate configuration of QoS parameters in an underlying transport network which may connect IoT entities involved in a relationship.

The RM Service may initiate configuration of schedule parameters of IoT entities involved in a relationship such that their schedules may be aligned with one another. Example schedule parameters may comprise sleep, communication, or functional parameters, among others.

At step 6, upon establishment of a relationship between IoT entities, the RM Service may create an RM State, which may be used by the RM Service to keep track of the relationship and further manage it (e.g., modify or teardown).

At step 7, upon establishment of a relationship between IoT entities, the RM Service may optionally initiate notifications of the relationship establishment to the IoT entities involved in the relationship and/or other IoT entities that may be interested in the relationship being established (e.g., the IoT entity that created the RM Policy). Such notifications may comprise an RM State that may include information such as, but not limited to, the following:

- a list of identifiers of the IoT entities involved in the relationship;
- an establishment time of the relationship, which may be extended if the IoT Application(s) and/or IoT Entity(s) execute a relationship refresh;
- a planned tear-down time of the relationship;
- an identifier of the RM Policy used to create the relationship; and
- one or more identifiers of SL resources that the RM Service may have created because of the relationship establishment (e.g., group, schedule, location, and subscriptions resources).

At step 8, after the RM Service establishes a relationship between IoT entities, the IoT entities involved in the relationship may be given abilities to interact and communicate with one another. Such abilities may be achieved by the RM Service creating and configuring proper SL groups, subscriptions, credentials, access control policies, up-front requests, QoS configuration(s) in the underlying network, and/or schedules on behalf of the IoT entities involved in the relationship.

At step 9, similarly to step 3, based on the RM Trigger Criteria defined within the RM Policies, the RM Service may evaluate the RM Context it collects to determine whether criteria have been met to trigger the modification of a relationship between applicable IoT entities.

At step 10, based on RM Trigger Criteria defined within an RM Policy, the RM Service may determine that a relationship between IoT entities requires modification, refresh, or termination. The RM Service may trigger the modification, refresh, or termination of the relationship and may perform the RM Actions in step 11.

At step 11, similarly to step 5, based on RM Actions defined within an RM Policy, the RM Service may perform actions when it modifies a relationship between IoT entities involved. Such RM Actions may involve the RM Service performing requests on behalf of IoT entities involved in a relationship. The RM Service may also initiate requests to other services hosted within the SL manage the relationship. The RM Service may initiate RM Actions such as, but not limited to, the following.

The RM Service may initiate the update of an SL group resource and may re-configure the IoT entities involved in a relationship as members of such a group resource.

The RM Service may initiate the update of an SL subscription on an SL resource and may re-configure the SL to send notifications to IoT entity(s) that are involved in a relationship.

The RM Service may initiate the revocation of credentials from the IoT entities involved in a relationship before the relationship is modified. The RM Service may then initiate the generation and bootstrapping of SL credentials to IoT entities involved in the modified relationship such that they may communicate securely with one another.

The RM Service may initiate the revocation of access control privileges from the IoT entities involved in a relationship before the relationship is modified. The RM Service may then initiate creation and/or configuration of access control privilege on SL resources affiliated with IoT entities involved in the modified relationship to allow access to these resources by these IoT entities.

The RM Service may initiate one or more SL requests targeting IoT entities involved in the modified relationship.

The RM Service may initiate re-configuration of QoS parameters in an underlying transport network that connects IoT entities involved in the modified relationship.

The RM Service may initiate re-configuration of schedule parameters of IoT entities involved in the modified relationship such that their schedules may be aligned with one another, such as sleep, communication, or functional, for example.

At step 12, upon modification of a relationship between IoT entities the RM Service may update RM State hosted in the SL. The RM Service may also share this updated RM State with other IoT entities.

At step 13, upon modification of a relationship between IoT entities, the RM Service may optionally initiate notifications of the modified relationship to the IoT entities involved in the relationship and/or other IoT entities that may be interested in knowing the relationship has been modified (e.g., the IoT entity that created the RM Policy). These notifications may contain RM State that may include information such as but not limited to the following:

- an updated list of identifiers of the IoT entities involved in the modified relationship;
- a time the relationship was modified;
- a planned tear-down time of the relationship;
- an identifier of the RM Policy used to modify the relationship;
- identifiers of SL resources that the RM Service modified because of the relationship modification (e.g., group, schedule, access control policies location, and subscriptions resources); and
- issuance of new security credentials if existing security credentials are compromised.

At step 14, once the RM Service modifies a relationship between IoT entities, the IoT entities involved in the relationship may be given abilities to interact and communicate with one another. Such abilities may be achieved by the RM Service updating the proper SL groups, subscriptions, credentials, access control policies, up-front requests, QoS configuration in the underlying network, and/or schedules on behalf of the IoT entities involved in the relationship (as described in step 11). Updating such information may comprise updating resources that are stored in the service layer or sending messages to the IoT Device(s) or IoT Application(s) to update resources of the IoT Device(s) or IoT Application(s).

At step 15, similarly to step 3, based on the RM Trigger Criteria defined within the RM Policies, the RM Service may evaluate a collected RM Context to determine whether any RM Trigger Criteria have been met to trigger the tear-down of a relationship between applicable IoT entities.

At step 16, based on RM Trigger Criteria defined within an RM Policy, the RM Service may determine that a relationship between IoT entities requires tear-down. For example, the SL resource representing an IoT entity may have expired or may have been removed, thus ending the relationship. The RM Service may trigger the tear-down of the relationship. The RM Service may also temporarily deactivate a relationship (not shown). For example, rather than tearing down a relationship that is not being used, an RM Service may instead deactivate the relationship during periods of inactivity and then re-activate the relationship if/when activity from the relationship participants resumes. When a relationship is deactivated, the RM Service may coordinate the deactivation of relationship based services (e.g., deactivate an SL group or a subscription). Then the RM Service may reactivate relationship based services.

At step 17, similarly to step 5, based on RM Actions defined within an RM Policy, the RM Service may perform actions when it tears-down a relationship between IoT entities. Such RM Actions may involve the RM Service performing requests on behalf of IoT entities involved in a relationship. The RM Service may also initiate requests to other services hosted within the SL to manage the relationship. The RM Service may initiate RM Actions such as but not limited to the following.

The RM Service may initiate the delete of an SL group resource or a member of the SL group resource.

The RM Service may initiate the delete of an SL subscription on an SL resource and send a notification that the subscription was deleted.

The RM Service may initiate the revocation of credentials from the IoT entities involved in the relationship being torn-down.

The RM Service may initiate the revocation of access control privileges from the IoT entities involved in the relationship being torn-down.

The RM Service may initiate one or more SL requests targeting IoT entities involved in the relationship being torn-down.

The RM Service may initiate revocation of QoS parameters in an underlying transport network which connects IoT entities involved in the relationship being torn-down.

The RM Service may initiate the update or removal of schedule parameters of IoT entities involved in the relationship being torn down.

At step 18, upon tear-down of a relationship between IoT entities the RM Service may update or delete an RM State hosted in the SL.

At step 19, upon tear-down of a relationship between IT entities, the RM Service may optionally initiate notifications of the tear-down of the relationship. Such notifications may be sent to the IoT entities involved in the relationship and/or other IoT entities that may be interested in the relationship has been torn-down (e.g., the IoT entity that created the RM Policy). These notifications may contain RM State that may include information such as, but not limited to, the following:

a list of identifiers of the IoT entities involved in the torn-down relationship;

a time the relationship was torn-down;

an identifier of the RM Policy used to tear-down the relationship; and.

identifiers of SL resources that the RM Service updated and/or deleted because of the relationship tear-down (e.g., group, schedule, location, and subscriptions resources.

Smart City Embodiment

Example smart city embodiments of the introduced relationship management functionalities are described herein. Example embodiments describe one or more possible smart public transportation systems.

A smart city may have built a smart public transportation system that comprising of unmanned vehicles that may dynamically connect and disconnect to and from one another to form trains of unmanned vehicles. This connection and disconnection may be based on situational context such as vehicles located in the same vicinity and traveling in the same direction as one another, passengers in one vehicle needing to meet up with other passengers in other vehicles, passengers or goods needing to be transferred between vehicles, or one vehicle requiring fuel (e.g., battery) and other vehicles having spare fuel that may be shared.

To manage the dynamic connecting and disconnecting of the vehicles, the city may leverage its IoT SL platform that supports an RM Service. The city may configure the RM Service with a set of RM Policies that define RM Trigger Criteria for when the unmanned vehicles are to connect to one another (i.e., establish a relationship) and disconnect from one another (i.e., tear-down a relationship). For example, the city may define the following RM Trigger Criteria: Compatibility Relationship Criteria; State Relationship Criteria; Location Relationship Criteria; Schedule Relationship Criteria; and User Relationship Criteria.

Compatibility Relationship Criteria may define the makes and models of unmanned vehicles that are compatible and able to connect and disconnect with one another.

State Relationship Criteria may define state-based criteria for when vehicles should connect or disconnect. Examples of such criteria may include criteria that define the threshold for when a vehicle's battery is considered low and needs charging and the threshold for when a vehicle's battery is considered high enough such that vehicles may connect and share their battery charge or criteria that define when one vehicle is at max occupancy and other vehicles are not such that the vehicles may connect and exchange passengers.

Location Relationship Criteria may define criteria for when vehicles should connect based on current location (e.g., less than 1 mile) and/or intermediate way point or destination locations.

Schedule Relationship Criteria may define criteria for when vehicles should connect based on their schedules. An example of such criteria may include two vehicles traveling in the same direction at similar times.

In addition to the RM Policies and RM Trigger Criteria configured by the city, users may also be allowed to configure their own RM Policies and RM Trigger Criteria. User Relationship Criteria may define criteria for when vehicles should connect based on user relationships, such as two users that know each other and that would like to travel together with one another, for example.

Within an RM Policy, RM Actions may also be defined by the city and/or users. Such RM Actions may then be performed by the RM Service if/when the RM Trigger Criteria have been satisfied for vehicles to connect or disconnect from one another. For example, the following requests may be initiated by the RM Service.

A request may be initiated by the RM Service to send a notification to the city's transportation command and control center if/when vehicles connect and disconnect. For example, the notifications may comprise information such as a list of identifiers of the vehicles involved, an establishment time of the connect or disconnect, a planned disconnect time, and/or identifiers of SL resources that the RM Service created because of the relationship establishment (e.g., group, schedule, location, and subscriptions resources).

A request may be initiated by the RM Service to trigger vehicles involved in a relationship connect or disconnect to perform a specified request on specified SL resources (e.g., provide a count of the number of passengers in the vehicle, provide a battery level measurement, etc.).

A request may be initiated by the RM Service to create, bootstrap, or revoke SL credentials for one or more vehicles that are connected to one another. These SL credentials may be used by the vehicles to authenticate and establish a secure and trusted relationship with one another such that they may securely communicate with each other.

A request may be initiated by the RM Service to create, update, or delete an SL group resource representing vehicles connected to one another if/when they initially connect, another vehicle is added/remove, or all the vehicles disconnect, respectively. The RM Service may continually update the members of the SL group to reflect the vehicles involved. This SL group resource may then be used by the city to perform group based operations on vehicles connected to one another and may, for example, more easily monitor the battery and passenger occupancy levels in the vehicles.

A request may be initiated by the RM Service to create, update, or delete a subscription to an SL resource if/when a relationship is established, modified, or torn-down between vehicles, respectively. The RM Service may continually update the subscription to reflect the IoT entities involved in the relationship and IoT entities that are to receive notifications regarding changes that occur to the subscribed SL resource. For example, a subscription may be created to generate a notification if/when one of the connected vehicles requires a disconnect, such as when, based on a current location and a destination of the vehicle, the vehicle should disconnect and travel its own direction.

A request may be initiated by the RM Service to create, update, or delete an SL access control policy if/when a connection between vehicles is established, modified or torn-down, respectively. For example, vehicles connected to one another may be granted access to each other's diagnostic information, such as, for example, battery level.

A request may be initiated by the RM Service to configure, re-configure, or delete schedule policies and/or parameters of vehicles connected and/or disconnected to and from one another. The schedule may reflect times that the vehicles are connected to one another, times in which the vehicles are scheduled to disconnect, and times in which the vehicles are to arrive at certain locations on their journey.

OneM2M Embodiment

Example oneM2M embodiments of the introduced RM service functionality are described herein. Example embodiments describe one or more possible implementations of an RM Service.

Figure 10:
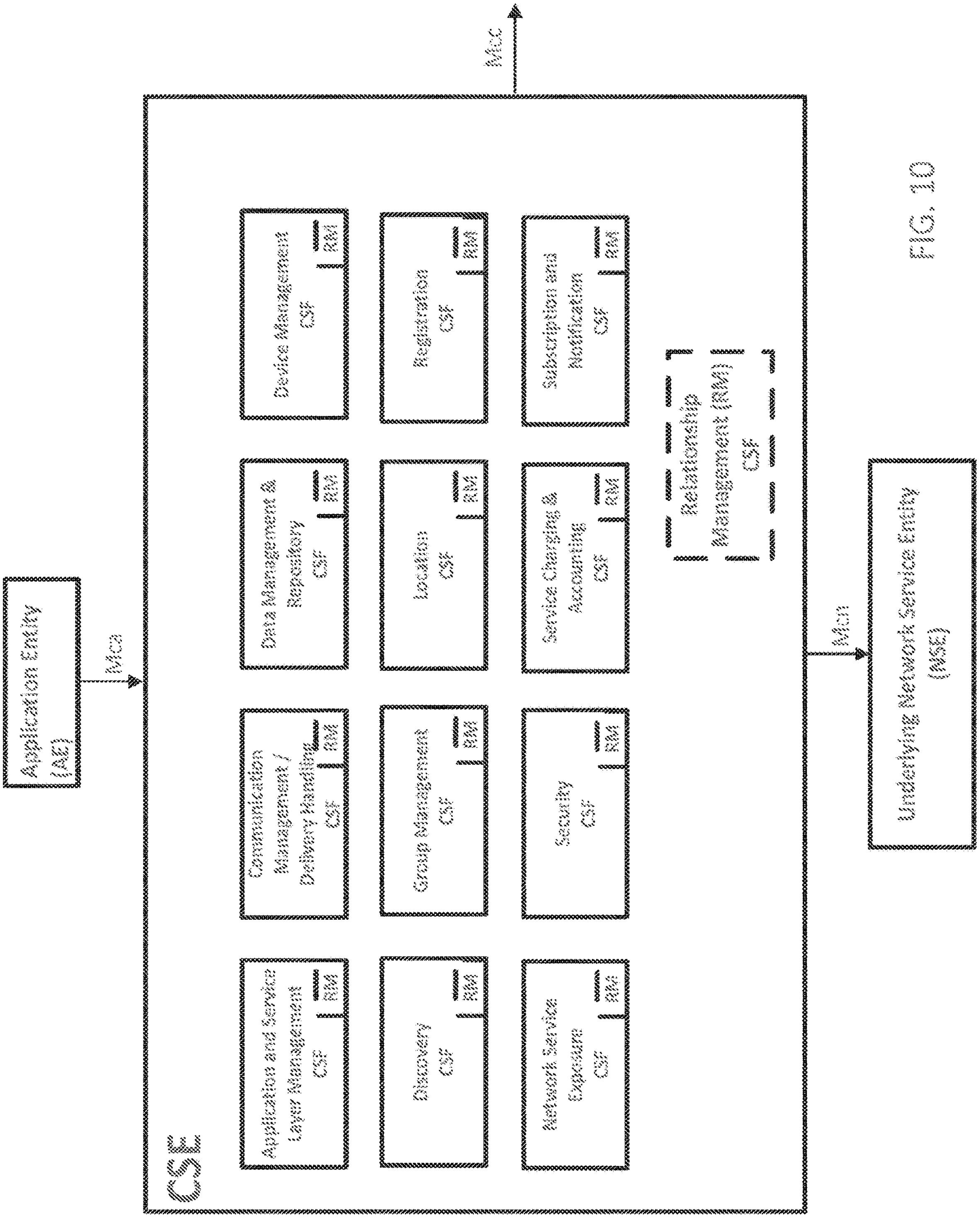
FIG. 10 illustrates an example common service entity (CSE) implementing RM Service functionality.

As shown in FIG. 10, the RM Service may be implemented as a new Common Service Function (CSF) that implements the RM Service functionality as described herein. RM Service functionality may also be realized as a capability of existing oneM2M CSFs.

Figure 11:
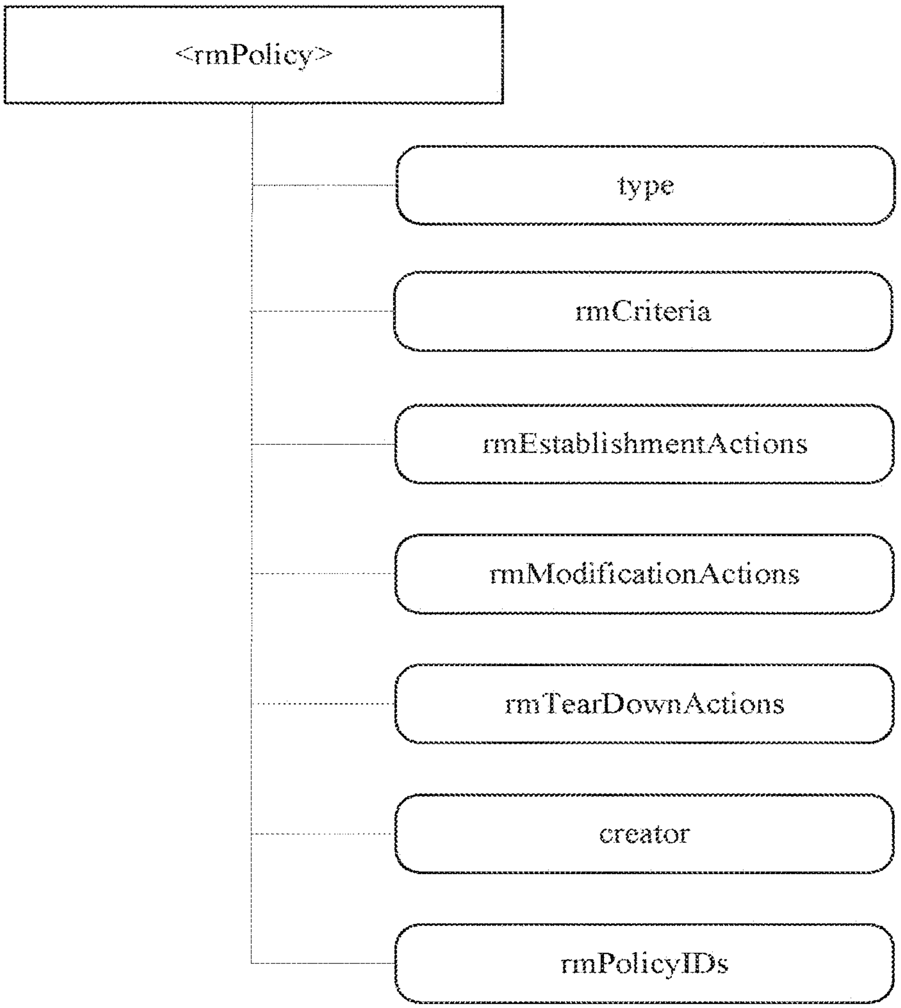
FIG. 11 illustrates an example oneM2M resource.

In a oneM2M embodiment, the RM CSF may support an RM Policy resource such as the example <rmPolicy> resource shown in FIG. 11. A <rmPolicy> resource may be created, updated, and deleted by an AE or CSE or provisioned into the RM CSF using out-of-band mechanisms, such as device management, for example. A <rmPolicy> resource may support attributes as defined in Table 4, which are based on the RM Policy attribute definitions defined in Table 1, above.

TABLE 4

< rmPolicy> Resource Attributes

| Attribute | Description |
|---|---|
| type | The type of Relationship applicable to this <rmPolicy>. |
| rmCriteria | Conditions that should be met for the RM CSF to establish and maintain a relationship defined by this policy. |
| rmEstablishmentActions | A list of one or more actions that the RM CSF may perform when establishing a relationship based on this policy. This list of actions may be realized as a list of resourceIDs of <transaction> resources. A <transaction> resource may have one or more requests associated with it. The RM CSF may trigger the execution of the request(s) associated with the <transaction> resource. |
| rmModificationActions | A list of one or more SL actions that the RM CSF may perform when modifying a relationship based on this policy. This list of actions may be realized as a list of resourceIDs of <transaction> resources. A <transaction> resource may have one or more requests associated with it. The RM CSF may trigger the execution of the request(s) associated with the <transaction> resource. |
| rm TearDownActions | A list of one or more SL actions that the RM CSF may perform when tearing-down a relationship based on this policy. This list of actions may be realized as a list of resourceIDs of <transaction> resources. A <transaction> resource may have one or more requests associated with it. The RM CSF may trigger the execution of the request(s) associated with the <transaction> resource. |

TABLE 4-continued

| < rmPolicy> Resource Attributes | |
|---|---|
| Attribute | Description |
| creator | The identifier of the IOT entity that created the policy. |
| rmPolicyIDs | A link to one or more other <rmPolicy> resources that may be used by the RM CSF to create relationships defined by multiple <rmPolicy> resources. |

Figure 12:
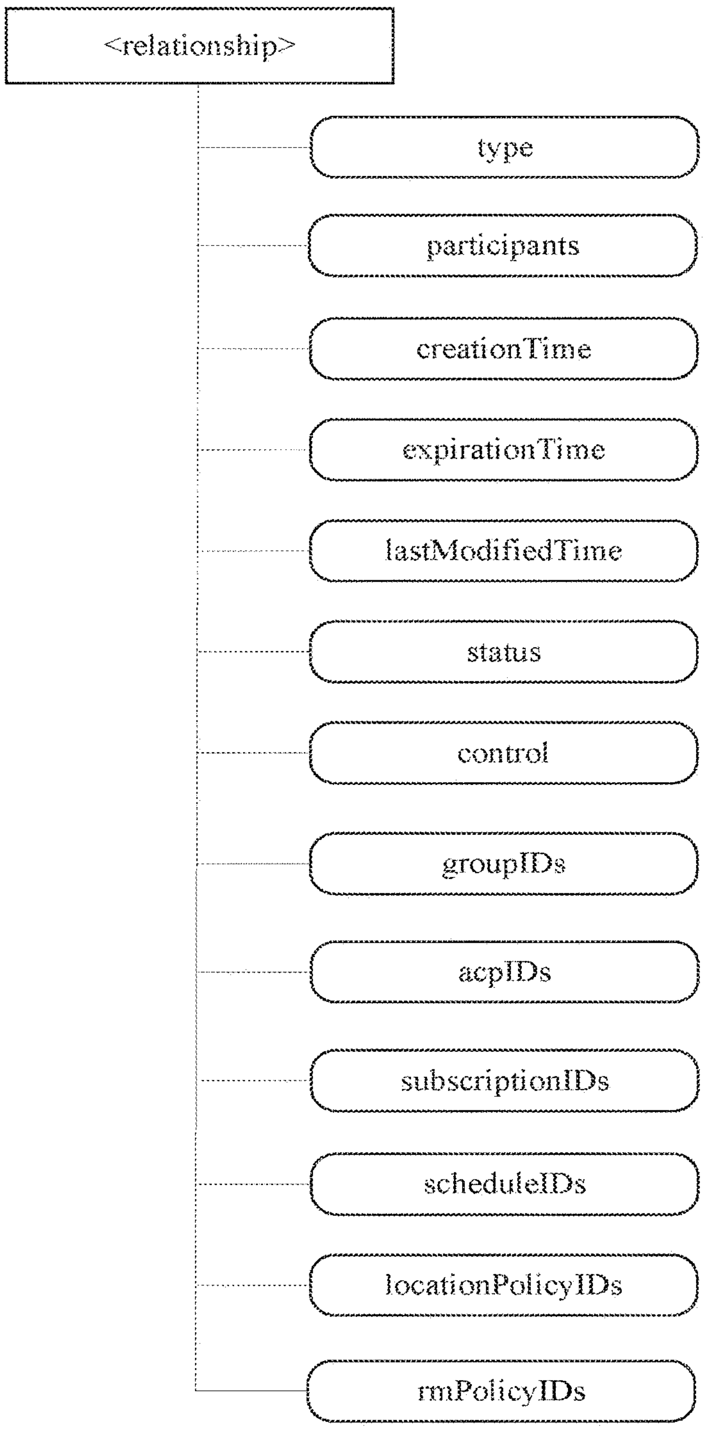
FIG. 12 illustrates an example oneM2M resource.

In a oneM2M embodiment, the RM CSF may maintain RM State in a resource such as the example <relationship> resource shown in FIG. 12. A <relationship> resource may be created, updated, and deleted by the RM CSF when a relationship is established, modified, and torn-down, respectively. A <relationship> resource may support attributes as defined in Table 5, which are based on the RM State attribute definitions defined in Table 3. In addition, a link (e.g., relationshipLink) to a <relationship> resource may also be added to existing oneM2M resources to reflect IoT entities that are participants in the relationship (e.g., <AE>, <remoteCSE>, or other IoT entities). Alternatively or additionally, a lighter-weight option to defining a new <relationship> resource may be the addition of one or more relationship-centric attributes to existing oneM2M resources. For example, one or more new attributes may be added to <AE>, <remoteCSE>, or other IoT/oneM2M resources. Similar attributes to those defined in the example <relationship> resource may be defined for other oneM2M resource types.

TABLE 5

| < relationship> Resource Attributes | |
|---|---|
| Attribute | Description |
| Type | The type of relationship. |
| participants | Entities involved in the relationship. For an entity, one or more of the following may be maintained:<br>Unique ID of the IoT entity (e.g., AE-ID or CSE-ID)<br>ID(s) of SL resource(s) representing IoT entity (e.g., resourceID of <AE> or <remoteCSE> resource)<br>Role that IoT entity has in the relationship (e.g., master, slave, etc.) |
| creation Time | Time when relationship was established and the <relationship> resource was created. |
| expiration Time | Time when relationship will be torn-down and the <relationship> resource will be deleted. |
| lastModifiedTime | Time when the relationship was last modified and the <relationship> resource was updated. |
| groupIDs | The identifiers of oneM2M <group> resources associated with this relationship. When a relationship is established by the RM CSF and a <group> resource is created for the relationship, then the RM CSF may add the <group> resource identifier to this list. |
| acpIDs | The identifiers of oneM2M <accessControlPolicy> resources associated with this relationship. When a relationship is established by the RM CSF and <accessControlPolicy> resources are created for the relationship, then the RM CSF may add the <accessControlPolicy> resource identifiers to this list. |
| subscriptionIDs | The identifiers of oneM2M <subscription> resources associated with this relationship. When a relationship is established by the RM CSF and <subscription> resources are created for the relationship, then the RM CSF may add the <subscription> resource identifiers to this list. |
| scheduleIDs | The identifiers of oneM2M <schedule> resources associated with this relationship. When a relationship is established by the RM CSF and <schedule> resources are created for the relationship, then the RM CSF may add the <schedule> resource identifiers to this list. |
| locationPolicyIDs | The identifiers of oneM2M <locationPolicy> resources associated with this relationship. When a relationship is established by the RM CSF and <locationPolicy> resources are created for the relationship, then the RM CSF may add the <locationPolicy> resource identifiers to this list. |
| rmPolicyIDs | A link to one or more <rmPolicy> resources that the RM CSF may use to establish, modify, or tear-down this relationship. |
| candidates | List of entities that are candidates to be included in the relationship. This list may allow an AE/CSE managing the relationship to optionally include the candidates in the relationship by adding the entities to the participants. |
| history | History of the relationship (e.g., requests performed on or by the participants of the relationship or the amount of data produced or consumed by the participants). |

Figure 13A:
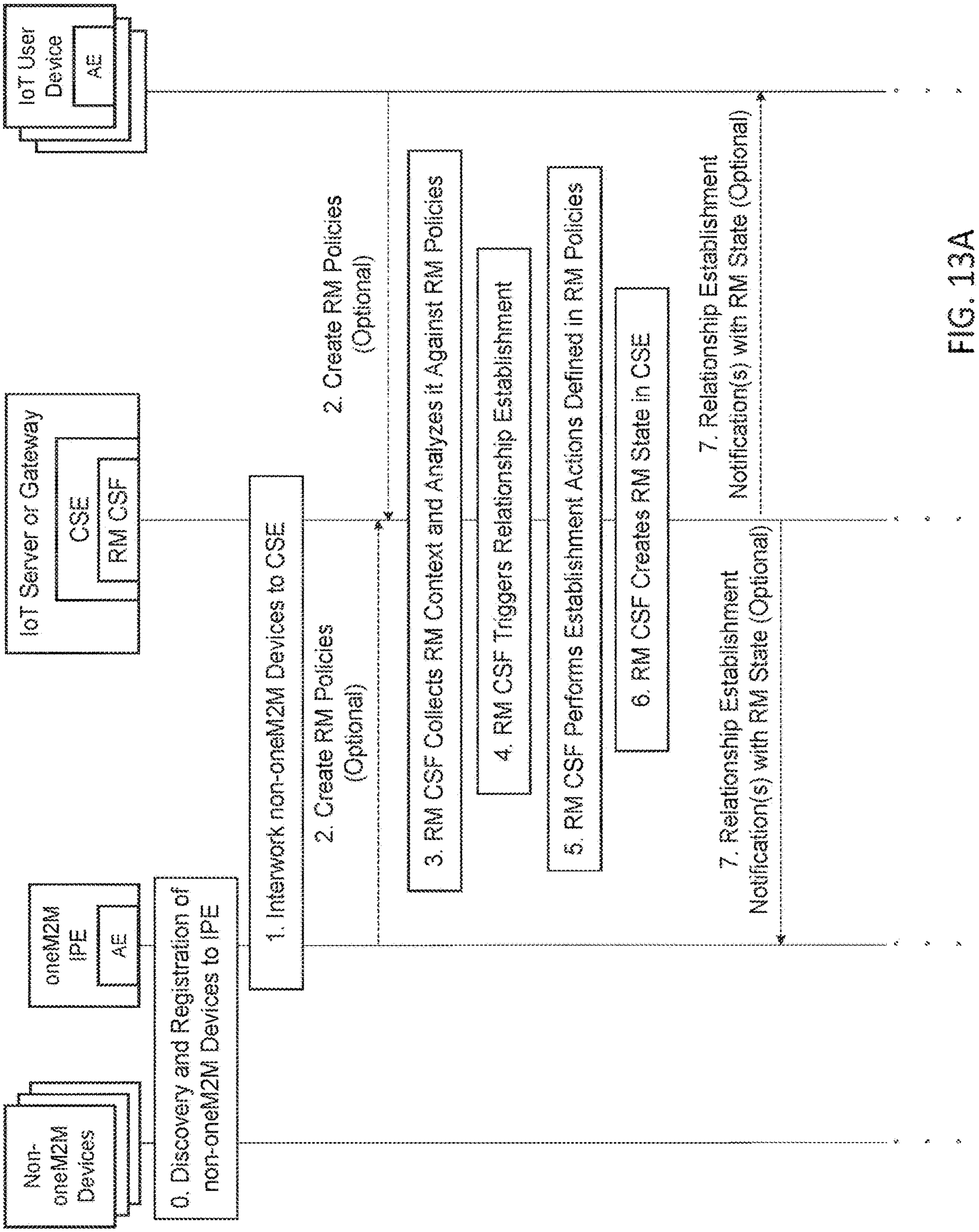
FIGS. 13A-B illustrate an example sequence diagram of RM Service processing in a oneM2M system.
Figure 13B:
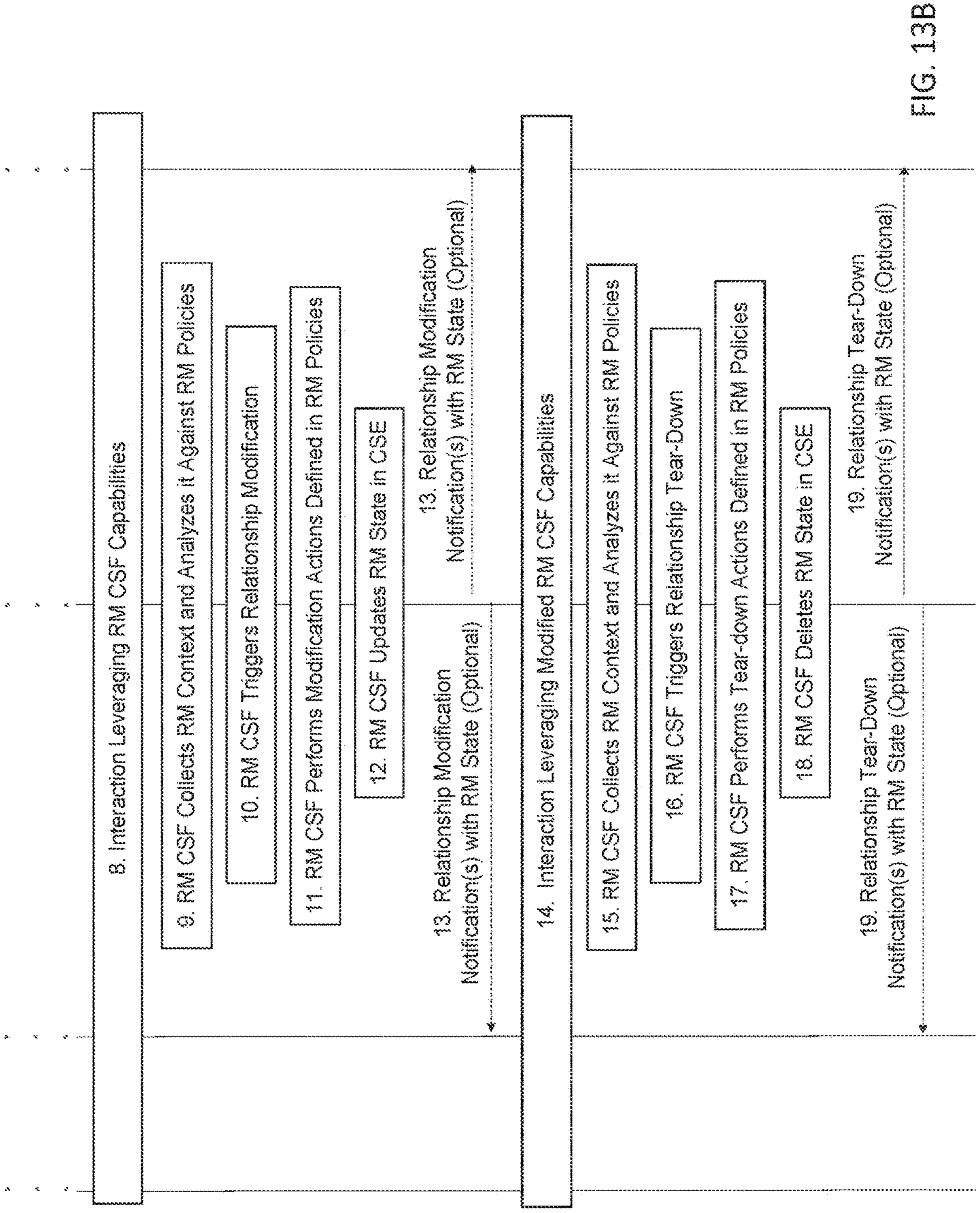

FIGS. 13A-B illustrate an example oneM2M process flow in which the RM functionality described herein may be used. In this process flow, a oneM2M Interworking Proxy Entitiy (IPE) is used to interwork non-oneM2M devices to a server that hosts a oneM2M CSE. The RM CSF manages relationships between interworked non-oneM2M devices and oneM2M AEs hosted on IoT user devices. Both the AEs hosted on the IoT field devices and user devices are registered to the CSE.

At step 0, the oneM2M Interworking Proxy Entity (IPE) may discover non-oneM2M devices. Alternatively, non-oneM2M devices may discover and/or register to the IPE. During such discovery/registration, information about the individual devices may be exchanged (e.g., type of device, location of device, reporting rate of device, function of device, interface of the device, etc.).

At step 1, the oneM2M IPE may interwork the non-oneM2M devices to the oneM2M CSE hosted in the IoT Server or Gateway. The non-oneM2M devices may be modeled as oneM2M resources hosted in the CSE. For example, oneM2M resource types such as <AE>, <node>, <container>, <flexContainer>, <contentInstance>, <timeSeries>, <timeSeriesInstance>, <schedule>, <group>, <semanticDescriptor>, etc., may be used to interwork and model non-oneM2M devices in the CSE. Within such resources, the IPE may configure information about the devices that was obtained in step 0.

At step 2, the oneM2M IPE may send requests to the CSE to create RM Policies comprising rules that provide guidance to the RM CSF for the establishment, modification, and tear-down of relationships between the interworked non-oneM2M devices that have been modeled using oneM2M resources in the CSE. Requests to create RM Policies may be issued by the IPE at different times. For example, such requests may be issued when a non-oneM2M device registers or de-registers, when an AE registers to a CSE, or sometime thereafter. Requests to create RM Policies may be performed via resource CREATE requests. Alternatively, RM Policies comprising rules that provide guidance to the RM CSF for the establishment, modification, and tear-down of relationships between AEs may optionally be pre-provisioned into the RM CSF of a CSE. For example, RM Policies may be hard coded into the RM CSF by a developer at the time of RM CSF development, pre-configured into the RM CSF at the time of deployment, or configured using out-of-band mechanisms by a service provider that owns and operates an RM CSF within its service platform. Some examples of out-of-band mechanisms may include a management portal that a service provider may use to configure and manage its platform or a device management server that the service provider may use to push RM Policies to the RM CSF in its service platform. The rules within RM Policies may include information such as the type of relationship applicable to the policy, the RM Trigger Criteria that the RM CSF may use to trigger the establishment, modification, and/or tear-down of relationships associated with this policy, and the RM Actions that the RM CSF may perform when establishing, modifying, or tearing down a relationship associated with this policy.

At step 3, the RM CSF may collect RM Context from published metadata of the individual non-oneM2M devices that have been modeled using oneM2M resources by the IPE. The RM CSF may analyze the RM centric context in these resources against the RM Trigger Criteria defined within RM Policies that have been created and configured within the RM CSF. Based on the RM Trigger Criteria defined within the RM Policies, the RM CSF may determine whether any criteria have been met to trigger the establishment of a relationship between applicable interworked non-oneM2M devices. For example, if more than one non-oneM2M device uses the same type of <flexContainer> specialization, the CSE may determine that a functional compatibility relationship exists between them. If more than one non-oneM2M device uses the same or similar types of <semanticDescriptor> specialization, the CSE may determine that a functional compatibility, dependency, or semantic relationship exists between them. If more than one non-oneM2M device uses <locationPolicy> resource, the CSE may determine that a location relationship exists between them. If more than one non-oneM2M device uses a <schedule> resource, the CSE may determine that a schedule relationship exists between them. Other example relationship determinations based on the relationships described herein are also possible.

At step 4, based on RM Trigger Criteria defined within an RM Policy, the RM CSF may determine that a relationship between interworked non-oneM2M devices, IPE, and/or AEs may be established. The RM CSF may trigger and establish the type of relationship defined by the RM Policy.

At step 5, based on RM Actions defined within an RM Policy, the RM CSF may perform RM Actions when it establishes a relationship between interworked non-oneM2M devices, IPE, and/or AEs involved. These RM Actions may involve the RM CSF performing requests on behalf of interworked non-oneM2M devices involved in a relationship. The RM CSF may also initiate requests to other CSFs hosted within the CSE to manage the relationship. The RM CSF may initiate RM Actions such as, but not limited to, the following.

The RM CSF may initiate the creation of a <group> resource and may configure the interworked non-oneM2M device resources and/or AEs that communicate with them and are involved in a relationship as members of the <group> resource.

The RM CSF may initiate the creation of a <subscription> resource and may configure the notificationURI attribute of the <subscription> resource to send notifications to one or more interworked non-oneM2M devices, IPE, or AEs that are involved in a relationship.

The RM CSF may initiate the generation and bootstrapping of credentials to interworked non-oneM2M devices, their IPE, or other AEs involved in a relationship such that they may communicate securely with one another.

The RM CSF may initiate creation and/or configuration of <accessControlPolicy> resources (and/or the updating of privileges of existing <accessControlPolicy> resources) to grant AEs, IPE, and interworked non-oneM2M devices involved in a relationship to access to each other's resources.

The RM CSF may initiate one or more oneM2M requests targeting resources associated with AEs, IPE, and interworked non-oneM2M devices involved in a relationship.

The RM CSF may initiate configuration of QoS parameters in an underlying transport network that connects interworked non-oneM2M devices, IPE, and AEs involved in a relationship.

The RM CSF may initiate configuration of schedule parameters of interworked non-oneM2M devices, IPE, and AEs involved in a relationship such that their schedules may be aligned with one another to facilitate coordinated communication times.

At step 6, upon establishment of a relationship between interworked non-oneM2M devices and AEs, the RM CSF may create a <relationship> resource to store an RM State, which may be used by the RM CSF to monitor the relationship and further manage it (e.g., modify or tear-down). The RM CSF may also share RM State with other AEs, IPEs, and interworked non-oneM2M devices.

At step 7, upon establishment of a relationship between interworked non-oneM2M devices and AEs, IPE, the RM CSF may optionally initiate notifications of the relationship establishment to the interworked non-oneM2M devices, IPE, and AEs involved in the relationship and/or other interworked non-oneM2M devices, IPE, and AEs that may be interested in establishment of the relationship (e.g., the AE or IPE that created the RM Policy). These notifications may comprise an identifier or representation of a <relationship> resource (i.e., RM State).

At step 8, once the RM CSF establishes a relationship between interworked non-oneM2M devices, IPE and AEs, those entities involved in the relationship may be given the abilities to interact and communicate with one another. Such abilities may be achieved by the RM CSF creating and configuring the proper <group>, <subscription>, <schedule>, and <accessControlPolicy> resources and/or configuring credentials and underlying network QoS settings on behalf of those entities involved in the relationship.

At step 9, similarly to step 3, based on the RM Trigger Criteria defined within the RM Policies, the RM CSF may evaluate the RM Context it collects to determine whether any criteria have been met to trigger the modification of a relationship between applicable entities.

At step 10, based on RM Trigger Criteria defined within an RM Policy, the RM CSF may determine that a relationship between interworked non-oneM2M devices, IPE, and/or AEs requires modification. The RM CSF may trigger the modification of the relationship.

At step 11, similarly to step 5, based on RM Actions defined within an RM Policy, the RM CSF may perform actions when it modifies a relationship between interworked non-oneM2M devices, IPE, and/or AEs involved. Such RM Actions may comprise the RM CSF performing requests on behalf of those entities involved in a relationship. The RM CSF may also initiate requests to other CSFs hosted within the CSE to manage the relationship. The RM CSF may initiate RM Actions such as, but not limited to, the following.

The RM CSF may initiate the update of a <group> resource and re-configure the interworked non-oneM2M devices, IPE, and/or AEs involved in a relationship as members of the <group> resource.

The RM CSF may initiate the update of a <subscription> resource and re-configure the notificationURI attribute with the interworked non-oneM2M devices, IPE, and/or AEs involved in the relationship.

The RM CSF may initiate the revocation of credentials from the interworked non-oneM2M devices, IPE, and/or AEs involved in a relationship before the relationship is modified. The RM CSF may then initiate the generation and bootstrapping of new credentials to those entities involved in the modified relationship such that they may communicate securely with one another.

The RM CSF may initiate the delete or update of <accessControlPolicy> resources or privileges defined in these resources to revoke access privileges for any interworked non-oneM2M devices, IPE, and/or AEs no longer involved in the relationship and grant privileges for any new entities involved in the relationship.

The RM CSF may initiate one or more requests targeting resources associated with the interworked non-oneM2M devices, IPE, and/or AEs involved in the modified relationship.

The RM CSF may initiate re-configuration of QoS parameters in an underlying transport network that may connect interworked non-oneM2M devices, IPE, and/or AEs involved in the modified relationship (as well as any entities no longer involved).

The RM CSF may initiate re-configuration of schedule parameters of interworked non-oneM2M devices, IPE, and/or AEs involved in the modified relationship (as well as entities no longer involved) such that their schedules may be aligned with one another. For example, such parameters may comprise sleep, communication, functional, and other schedule parameters.

At step 12, upon modification of a relationship between interworked non-oneM2M devices, IPE, and/or AEs, the RM CSF may update the corresponding <relationship> resource with an RM State.

At step 13, upon modification of a relationship between interworked non-oneM2M devices, IPE, and/or AEs, the RM CSF may optionally initiate notifications of the modified relationship to the entities involved in the relationship and/or other entities that may be interested in modification of the relationship (e.g., the AE or IPE that created the RM Policy). Such notifications may comprise an identifier or representation of an updated <relationship> resource (i.e., RM State).

At step 14, once the RM CSF modifies a relationship between interworked non-oneM2M devices, IPE, and/or AEs, the entities involved in the relationship may be given the abilities to interact and communicate with one another. Such abilities may be achieved by the RM CSF updating the proper <group>, <subscription>, <accessControlPolicy>, or <schedule> resource, and/or credentials or underlying network QoS settings on behalf of the entities involved in the relationship (e.g., those entities described in step 11).

At step 15, similarly to step 3, based on the RM Trigger Criteria defined within the RM Policies, the RM CSF may evaluate the RM Context it collects to determine whether any RM Trigger Criteria have been met to trigger the tear-down of a relationship between applicable entities.

At step 16, based on RM Trigger Criteria defined within an RM Policy, the RM CSF may determine that a relationship between interworked non-oneM2M devices, IPE, and/or AEs requires tear-down. The RM CSF may trigger the tear-down of the relationship.

At step 17, similarly to step 5, based on RM Actions defined within an RM Policy, the RM CSF may perform actions when it tears-down a relationship between interworked non-oneM2M devices, IPE, and/or AEs. Such RM Actions may comprise the RM CSF performing requests on behalf of the entities involved in a relationship. The RM CSF may also initiate requests to other CSFs hosted within the CSE to manage the relationship. The RM CSF may initiate RM Actions such as, but not limited to, the following.

The RM CSF may initiate the delete of a <group> resource.

The RM CSF may initiate the delete of a <subscription> resource and send a notification that the <subscription> resource was deleted.

The RM CSF may initiate the revocation of credentials from the entities involved in the relationship being torn-down.

The RM CSF may initiate the revocation of access control privileges from the entities involved in the relationship being torn-down by deleting or updating <accessControlPolicy> resources.

The RM CSF may initiate one or more CSE requests targeting one or more resources of entities involved in the relationship being torn-down.

The RM CSF may initiate revocation of QoS parameters in an underlying transport network that may connect entities involved in the relationship being torn-down.

The RM CSF may initiate the update or removal of <schedule> resources or attributes within <schedule> resources for the entities involved in the relationship being torn down.

At step 18, upon tear-down of a relationship between interworked non-oneM2M devices, IPE, and/or AEs, the RM CSF may update or delete RM State in the corresponding <relationship> resource hosted in the CSE.

At step 19, upon tear-down of a relationship between interworked non-oneM2M devices, IPE and/or AEs, the RM CSF may optionally initiate notifications of the tear-down of the relationship. Such notifications may be sent to the entities involved in the relationship and/or other entities that may be interested in the relationship being torn-down (e.g., the AE or IPE that created the RM Policy). These notifications may comprise an identifier or representation of the <relationship> resource.

Example Graphical User Interface

Figure 14:
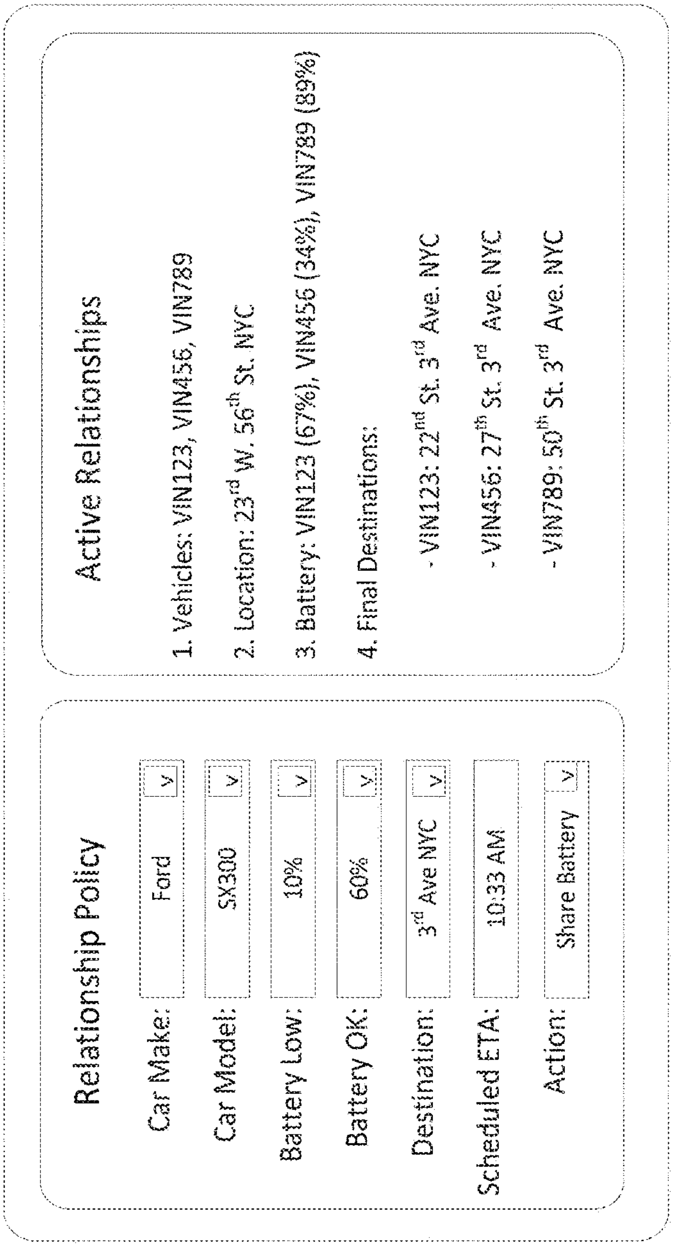
FIG. 14 illustrates an example graphical user interface (GUI)

An RM user interface may be implemented to assist a user with configuration of RM Policies and to receive notifications from the RM Service of established, modified, or torn-down relationships between IoT entities. The user interface may allow a user to configure RM Trigger Criteria and RM Actions that define a type of a relationship, criteria for establishing, modifying, or tearing-down the relationship, and actions that the RM Service performs when a relationship is established, modified, or torn down. The user interface may also display a list of one or more established relationships between IoT entities. For example, FIG. 14 shows an example user interface for the Relationship-based Smart City embodiment described herein.

Example Environment

Figure 15A:
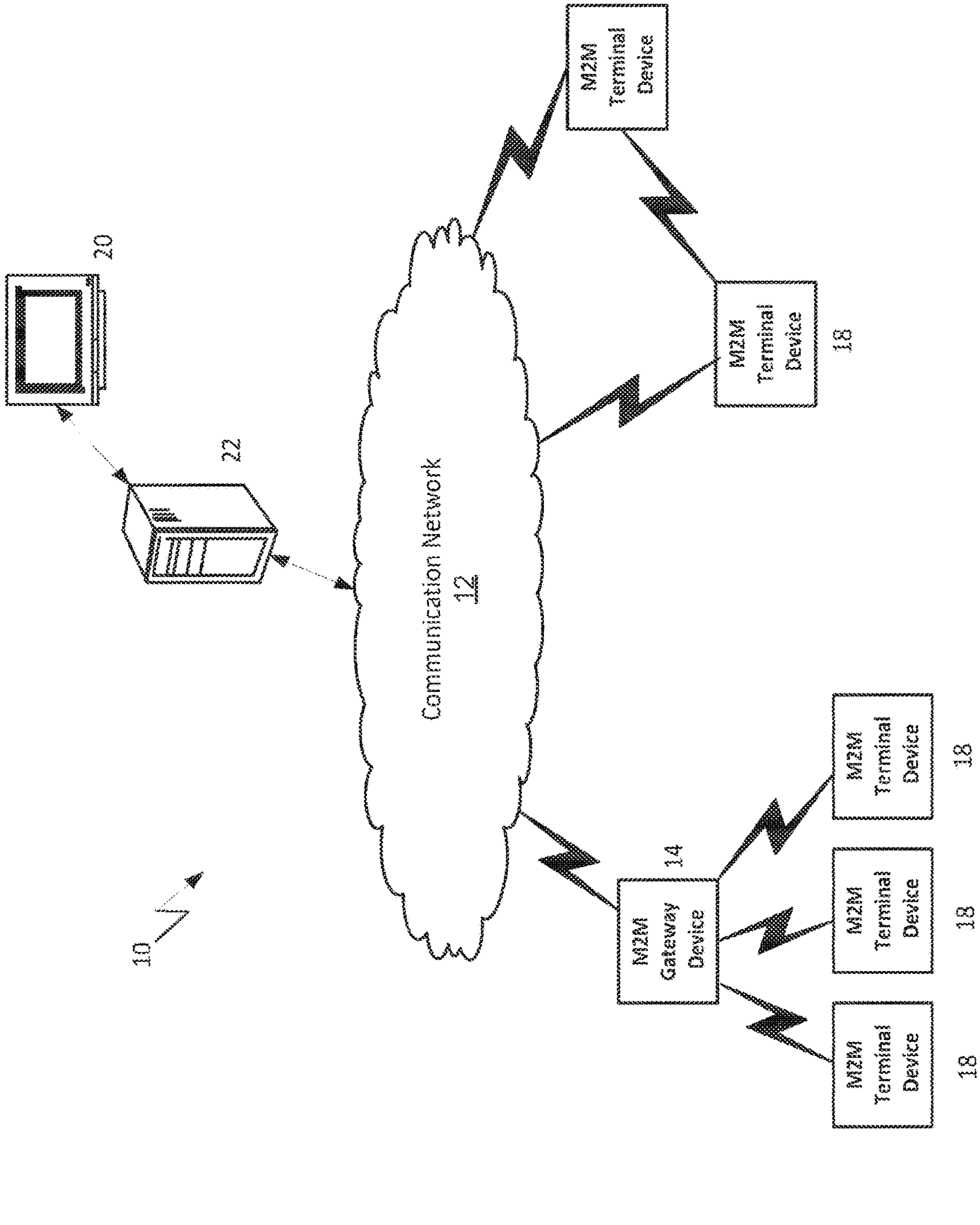
FIG. 15A is a system diagram of an example machine-to-machine (M2M), Internet of Things (IoT), or Web of Things (WoT) communication system in which one or more disclosed embodiments may be implemented.

FIG. 15A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIG. 2-6, 8-10, or 13A-B may comprise a node of a communication system, such as the ones illustrated in FIGS. 15A-D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above mentioned capabilities or functionalities, supported by the service layer, which may be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 15A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 15A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., ZigBee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 15B:
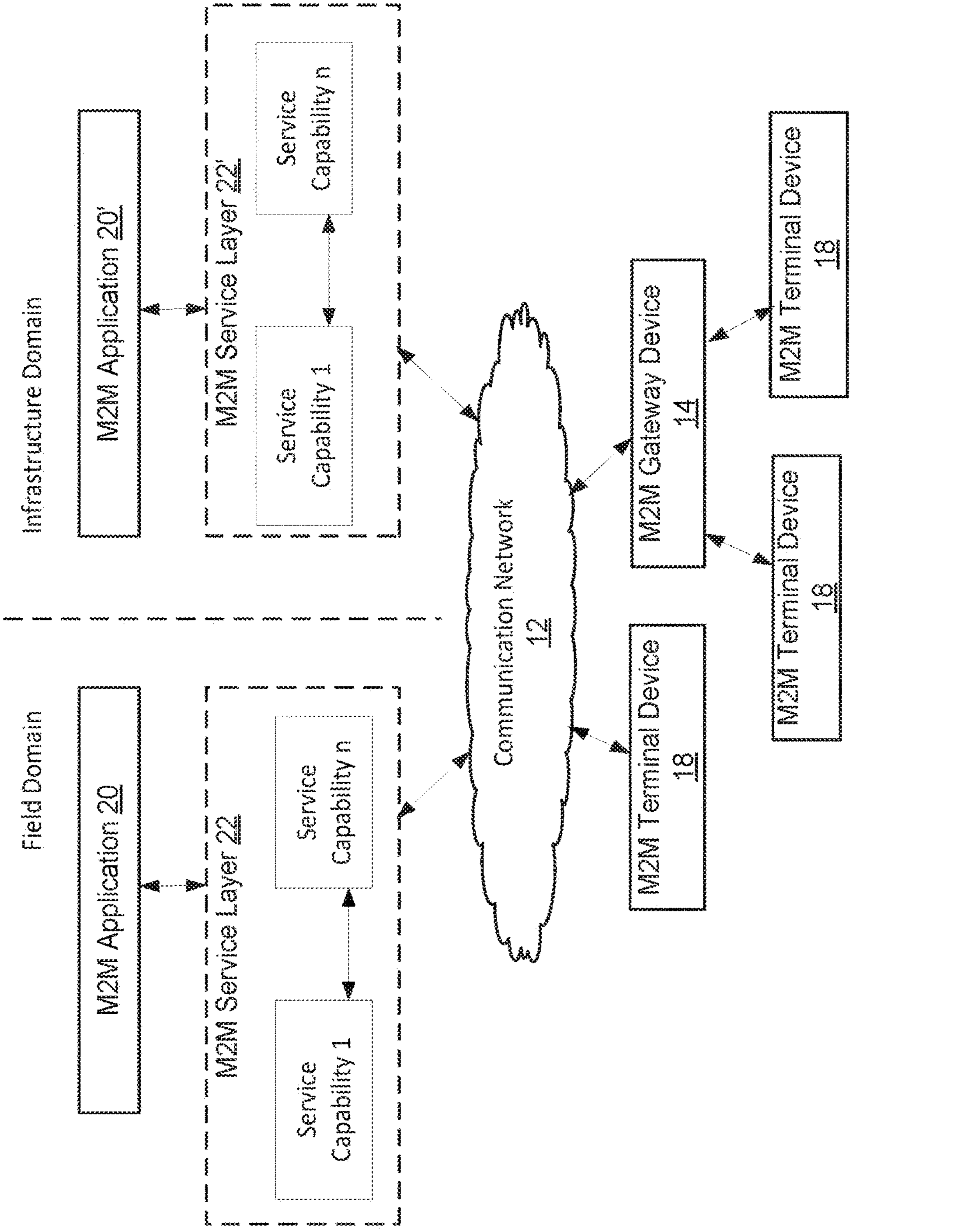
FIG. 15B is a system diagram of an example architecture that may be used within the M2M/IoT/WoT communications system illustrated in FIG. 15A.

Referring to FIG. 15B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 15B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 15B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SC S). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 15C or FIG. 15D described below.

Further, the methods and functionalities described herein may be implemented as part of an M2M network that uses a Service Oriented Architecture (SOA) and/or a Resource-Oriented Architecture (ROA) to access services.

Figure 15C:
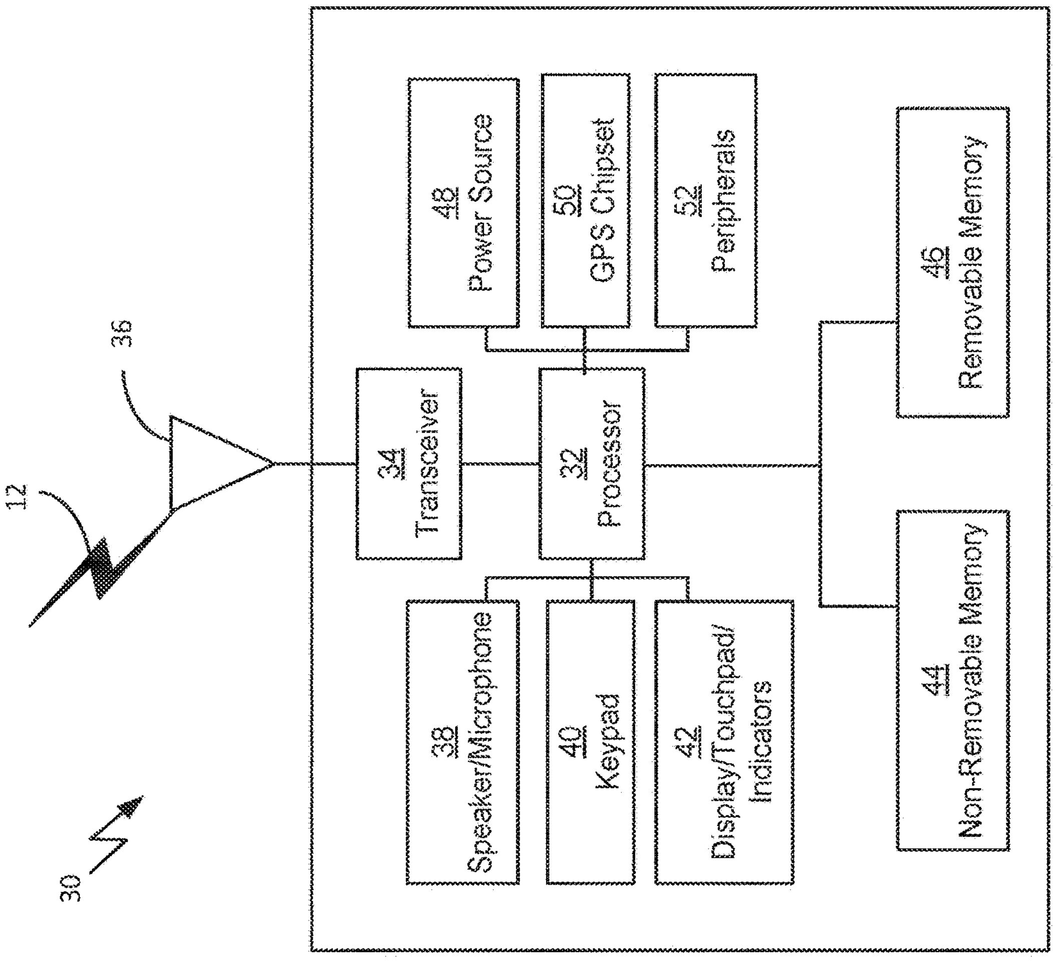
FIG. 15C is a system diagram of an example communication network node, such as an M2M/IoT/WoT device, gateway, or server that may be used within the communications system illustrated in FIGS. 15A and 15B.

FIG. 15C is a block diagram of an example hardware/software architecture of a node of a network, such as one of the clients, servers, or proxies illustrated in FIG. 2-6, 8-10, or 13A-B, which may operate as an M2M server, gateway, device, or other node in an M2M network such as that illustrated in FIGS. 15A and 15B. As shown in FIG. 15C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the USF functionality described herein, e.g., in relation to the methods described in reference to FIGS. 7, 9A-B, and 13A-B, or the data structures of FIGS. 1-6, 8, and 10-12, Tables 1-5, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 15C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 7, 9A-B, and 13A-B) and in the claims. While FIG. 15C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 15C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATS, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 15D:
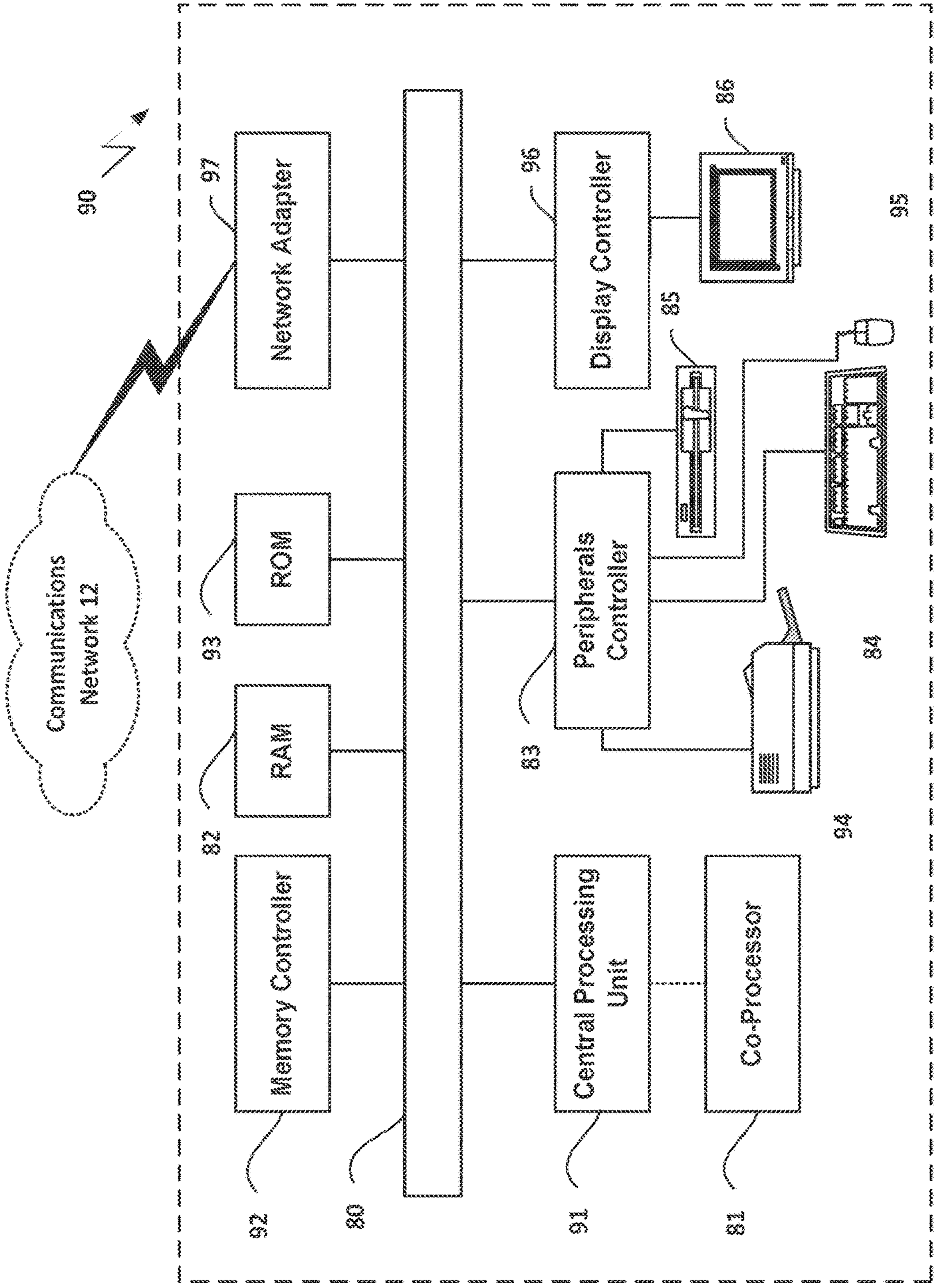
FIG. 15D is a block diagram of an example computing system in which a node of the communication system of FIGS. 15A and 15B may be embodied.

FIG. 15D is a block diagram of an exemplary computing system 90 which may also be used to implement one or more nodes of a network, such as the clients, servers, or proxies illustrated in FIG. 2-6, 8-10, or 13A-B, which may operate as an M2M server, gateway, device, or other node in an M2M network such as that illustrated in FIGS. 15A and 15B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 15A-D, to enable the computing system 90 to communicate with other nodes of the network. The communication circuitry, alone or in combination with the CPU 91, may be used to perform the transmitting and receiving steps described herein (e.g., in FIGS. 7, 9A-B, and 13A-B) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

It is understood that the entities performing the steps illustrated in FIGS. 7, 9A-B, and 13A-B, such as the IoT Devices, IoT Server, IoT Gateway, IoT Service Layer, RM Service, IoT Applications, oneM2M Devices, Non-oneM2M Devices, oneM2M IPE, AE, CSE, RM CSF, IoT User Device, UE, and the like, may be logical entities that may be implemented in the form of software (i.e., computer-executable instructions) stored in a memory of, and executing on a processor of, an apparatus configured for wireless and/or network communications or a computer system such as those illustrated in FIG. 15C or FIG. 15D. That is, the method(s) illustrated in FIGS. 7, 9A-B, and 13A-B may be implemented in the form of software (i.e., computer-executable instructions) stored in a memory of an apparatus, such as the apparatus or computer system illustrated in FIG. 15C or FIG. 15D, which computer executable instructions, when executed by a processor of the apparatus, perform the steps illustrated in FIGS. 7, 9A-B, and 13A-B. It is also understood that the functionality illustrated in FIGS. 7, 9A-B, and 13A-B may implemented as a set of virtualized network functions. The network functions may not necessarily communicate directly, rather, they may communicate via forwarding or routing function. It is also understood that any transmitting and receiving steps illustrated in FIGS. 7, 9A-B, and 13A-B may be performed by communication circuitry of the apparatus under control of the processor of the apparatus and the computer-executable instructions (e.g., software) that it executes.

The following is a list of acronyms relating to service level technologies that may appear in the above description. Unless otherwise specified, the acronyms used herein refer to the corresponding term listed below.

ADN Application Dedicated Node
AE Application Entity
API Application Programming Interfaces
ASE Automated Service Enrollment
ASE-C Automated Service Enrollment Client
ASE-S Automated Service Enrollment Server
ASN Application Service Node
CSE Common Service Entity
CSF Common Service Function
IN Infrastructure Network
IoT Internet of Things
IP Internet Protocol
M2M Machine to Machine
MN Middle Node
NODN Non-oneM2M Node
PoA Point of Access
RM Relationship Management
RM Service Relationship Management Service
ROA Resource Oriented Architecture
SL Service Layer
URI Uniform Resource Identifier This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

The invention claimed is:

1. An apparatus comprising:

a processor, and a memory, the apparatus being connected to a communications network, the apparatus further including computer-executable instructions stored in the memory of the apparatus which, when executed by the process or on behalf of the apparatus, cause the apparatus to implement a service layer entity on the communications network and cause the service layer entity to:

register a first apparatus connected to the communications network;

receive first metadata from the first apparatus;

register a second apparatus connected to the communications network;

receive second metadata from the second apparatus;

determine, based on the first metadata received from the first apparatus and the second metadata received from the second apparatus, a trigger condition of a Relationship Management (RM) policy is met to establish an entity relationship between the first apparatus and the second apparatus, wherein the entity relationship is one of a machine-to-machine (M2M) entity relationship or an Internet of Things (IoT) entity relationship:

establish, between the first apparatus and the second apparatus, the entity relationship corresponding to the trigger condition; and perform an action based on the entity relationship between the first apparatus and the second apparatus, wherein the action comprises performing one or more requests on behalf of the first apparatus or on behalf of the second apparatus, and wherein the RM policy includes information about one or more entity relationships, one or more action trigger conditions, and one or more actions, and wherein the action is one of the one or more actions defined in the RM policy, each of the one or more actions having a corresponding action trigger condition of the one or more action trigger conditions.

2. The apparatus of claim 1, wherein the action comprises at least one of:

sending a request to create, update, or delete a service layer resource; and sending a request to at least one of the first apparatus and the second apparatus.

3. The apparatus of claim 1, wherein the action is determined based on at least one of:

a type of the entity relationship; and the met trigger condition.

4. The apparatus of claim 1, wherein the instructions further cause the service layer entity to:

analyze data of requests sent by the first apparatus and the second apparatus to generate an RM context:

determine the RM context meets a second trigger condition; and establish a second entity relationship between the first apparatus and the second apparatus, wherein the second entity relationship corresponds to the second trigger condition.

5. The apparatus of claim 1, wherein a type of the established entity relationship is based on the met trigger condition.

6. The apparatus of claim 1, wherein a type of the entity relationship comprises at least one of:

a location relationship, an information sharing relationship, a master to slave relationship, a control relationship, a schedule relationship, or a semantic based relationship.

7. The apparatus of claim 1, wherein the RM policy is defined according to at least one of oneM2M or ETSI standards.

8. A method comprising, at a service layer entity:

registering a first apparatus;

receiving first metadata from the first apparatus;

registering a second apparatus;

receiving second metadata from the second apparatus;

determining, based on the first metadata and the second metadata, a trigger condition of a Relationship Management (RM) policy is met to establish an entity relationship between the first apparatus and the second apparatus, wherein the entity relationship is one of a machine-to-machine (M2M) entity relationship or an Internet of Things (IoT) entity relationship;

establishing, between the first apparatus and the second apparatus, the entity relationship corresponding to the trigger condition; and performing an action based on the entity relationship between the first apparatus and the second apparatus, wherein the action comprises performing one or more requests on behalf of the first apparatus for on behalf of the second apparatus, and wherein the RM policy includes information about one or more entity relationships, one or more action trigger conditions, and one or more actions, and wherein the action is one of the one or more actions defined in the RM policy, each of the one or more actions having a corresponding action trigger condition of the one or more action trigger conditions.

9. The method of claim 8, further comprising:

creating a resource of the service layer entity to store state information about the entity relationship;

determining an updated RM context between the first apparatus and the second apparatus; and modifying the stored state information based on the updated RM context.

10. The method of claim 9, further comprising:

determining the updated RM context does not meet the trigger condition; and tearing-down the entity relationship based on the updated RM context not meeting the trigger condition.

11. The method of claim 9, further comprising:

determining the updated RM context meets a second trigger condition to modify the entity relationship; and modifying the entity relationship based on the second trigger condition.

12. The method of claim 8, wherein the RM policy is defined according to at least one of oneM2M or ETSI standards.

13. The method of claim 8, further comprising:

based on the entity relationship, initiating a request on behalf of the first apparatus to CREATE, RETRIEVE, UPDATE, or DELETE one or more resources hosted on the service layer entity.

14. The method of claim 8, wherein a type of the entity relationship comprises at least one of:

a location relationship, an information sharing relationship, a master to slave relationship, a control relationship, a schedule relationship, or a semantic relationship.

15. A computer readable storage medium comprising computer-executable instructions which, when executed by a processor, cause the processor to implement a service layer entity and cause the service layer entity to:

register a first apparatus;

receive first metadata from the first apparatus;

register a second apparatus;

receive second metadata from the second apparatus;

determine, based on the first metadata received from the first apparatus and the second metadata received from the second apparatus, a trigger condition of a Relationship Management (RM) policy is met to establish an entity relationship between the first apparatus and the second apparatus, wherein the entity relationship is one of a machine-to-machine (M2M) entity relationship or an Internet of Things (IoT) entity relationship;

establish, between the first apparatus and the second apparatus, the entity relationship corresponding to the trigger condition; and perform an action based on the entity relationship between the first apparatus and the second apparatus, wherein the action comprises performing one or more requests on behalf of the first apparatus for on behalf of the second apparatus, and wherein the RM policy includes information about one or more entity relationships, one or more action trigger conditions, and one or more actions, and wherein the action is one of the one or more actions defined in the RM policy, each of the one or more actions having a corresponding action trigger condition of the one or more action trigger conditions.

16. The computer readable storage medium of claim 15, wherein the instructions further cause the service layer entity to:

initiate a request to configure Quality of Service (QoS) policies or parameters in an underlying communications network that connects the first apparatus to the second apparatus.

17. The computer readable storage medium of claim 15, wherein the action is determined based on at least one of:

a type of the entity relationship; and the met trigger condition.

18. The computer readable storage medium of claim 15, wherein the instructions further cause the service layer entity to:

analyze data of requests sent by the first apparatus and the second apparatus to generate an RM context;

determine the RM context meets a second trigger condition; and establish a second entity relationship between the first apparatus and the second apparatus, wherein the second entity relationship corresponds to the second trigger condition.

19. The computer readable storage medium of claim 15, wherein a type of the entity relationship comprises at least one of:

a location relationship, an information sharing relationship, a master to slave relationship, a control relationship, or a semantic based relationship.

20. The computer readable storage medium of claim 15, wherein the RM policy is defined according to at least one of oneM2M or ETSI standards.

* * * * *